(12) United States Patent
Puscasu et al.

(10) Patent No.: US 10,559,887 B2
(45) Date of Patent: Feb. 11, 2020

(54) MULTIBAND WAVELENGTH SELECTIVE STRUCTURE

(71) Applicants: FLIR Surveillance, Inc., Wilsonville, OR (US); Indiana University Research and Technology Corporation, Indianapolis, IN (US)

(72) Inventors: Irina Puscasu, Winchester, MA (US); William Schaich, Bloomington, IN (US)

(73) Assignees: FLIR SURVEILLANCE, INC., Wilsonville, OR (US); INDIANA UNIVERSITY RESEARCH AND TECHNOLOGY CORPORATION, Indianapolis, IN (US)

( * ) Notice: Subject to any disclaimer, the term of this patent is extended or adjusted under 35 U.S.C. 154(b) by 88 days.

(21) Appl. No.: 15/522,552

(22) PCT Filed: Nov. 4, 2015

(86) PCT No.: PCT/US2015/058913
§ 371 (c)(1),
(2) Date: Apr. 27, 2017

(87) PCT Pub. No.: WO2016/073537
PCT Pub. Date: May 12, 2016

(65) Prior Publication Data
US 2017/0338567 A1    Nov. 23, 2017

Related U.S. Application Data

(60) Provisional application No. 62/075,094, filed on Nov. 4, 2014.

(51) Int. Cl.
*H01Q 17/00* (2006.01)
*H01Q 15/00* (2006.01)
*G01S 13/00* (2006.01)

(52) U.S. Cl.
CPC .......... *H01Q 17/00* (2013.01); *H01Q 15/006* (2013.01)

(58) Field of Classification Search
CPC .............. H01Q 17/00; H01Q 15/0026; H01Q 15/0013; H01Q 15/006; H01Q 17/002;
(Continued)

(56) References Cited

U.S. PATENT DOCUMENTS 7,351,588 B2    4/2008 Poponin
7,956,793 B2    6/2011 Puscasu et al.
(Continued)

FOREIGN PATENT DOCUMENTS

| CN | 102769209 | 11/2012 | |
| FR | 2995734 A1 * | 3/2014 | ........... H01Q 17/002 |
| WO | WO 2010/094051 | 8/2010 | |

OTHER PUBLICATIONS

International Search Report and Written Opinion for International Application No. PCT/US2015/058913 dated Feb. 2, 2016.
(Continued)

*Primary Examiner* — Bernarr E Gregory
(74) *Attorney, Agent, or Firm* — Haynes and Boone, LLP

(57) ABSTRACT

A wavelength selective structure for selectively reflecting or absorbing incident electromagnetic visible or infrared radiation. The wavelength selective structure includes a wavelength selective structure with a plurality of layers, including a compound layer forming a plurality of surface elements, an electrically isolating intermediate layer, wherein the compound layer is in contact with a first surface of the electrically isolating intermediate layer, and a continuous electrically conductive layer in contact with a second surface of the electrically isolating intermediate layer. The compound layer includes at least one metallic layer and at least one dielectric layer. The selective surface has at least one reso-
(Continued)

nance band for selectively reflecting or absorbing visible or infrared radiation based on a resonant electromagnetic coupling between the plurality of surface elements and the continuous electrically conductive layer.

27 Claims, 14 Drawing Sheets

(58) Field of Classification Search
CPC .... H01Q 15/0086; G01J 5/0862; G01J 5/024; G01J 2003/1213; G02B 5/008
See application file for complete search history.

(56) References Cited

U.S. PATENT DOCUMENTS

| | | | |
|---|---|---|---|
| 7,973,696 | B2 | 7/2011 | Puscasu et al. |
| 8,441,094 | B2 | 5/2013 | Brueckl et al. |
| 8,643,532 | B1* | 2/2014 | Puscasu .............. H01Q 15/006 342/1 |
| 2003/0148133 | A1 | 8/2003 | Gustafsson |
| 2004/0008145 | A1 | 1/2004 | Killen et al. |
| 2005/0202594 | A1 | 9/2005 | Geosling |
| 2006/0148132 | A1 | 7/2006 | Geosling |
| 2007/0096352 | A1 | 5/2007 | Cochran et al. |
| 2007/0171120 | A1 | 7/2007 | Puscasu et al. |
| 2007/0222658 | A1 | 9/2007 | Puscasu et al. |
| 2011/0175672 | A1* | 7/2011 | Nguyen .............. H01Q 15/0086 327/534 |
| 2011/0203663 | A1 | 8/2011 | Prather et al. |
| 2011/0285942 | A1 | 11/2011 | Guo et al. |
| 2011/0304005 | A1 | 12/2011 | Brueckl et al. |
| 2013/0153767 | A1 | 6/2013 | Savoy et al. |
| 2014/0240159 | A1 | 8/2014 | Lawrence et al. |
| 2015/0229031 | A1* | 8/2015 | De Lustrac ............ H01Q 17/00 342/1 |

OTHER PUBLICATIONS

U.S. Appl. No. 15/522,505, filed Apr. 27, 2017, Puscasu.
15856473.2, May 3, 2018, Extended European Search Report.
15857750.2, May 8, 2018, Extended European Search Report.
PCT/US2015/058910, Jan. 21, 2016, International Search Report and Written Opinion.
Ye et al., "Analysis and Design of a Salisbury Screen Absorber with High Impedance Ground Plane", pp. 325-328, Department of Communication Engineering, Nanjing University of Science and Technology, Nanjing, China.
Ye et al., "Analysis and Design of a Salisbury Screen Absorber with High Impedance Ground Plane", 2013 Cross Strait Quad-Regional Radio Science and Wireless Technology Conference, Jul. 1, 2013 (Jul. 1, 2013), pp. 325-328, Department of Communication Engineering, Nanjing University of Science and Technology, Nanjing, China.
Extended European Search Report for European Application No. 15856473.2 dated May 3, 2018.
Extended European Search Report for European Application No. 15857750.2 dated May 8, 2018.
International Search Report and Written Opinion for International Application No. PCT/US2015/058910 dated Jan. 21, 2016.

* cited by examiner

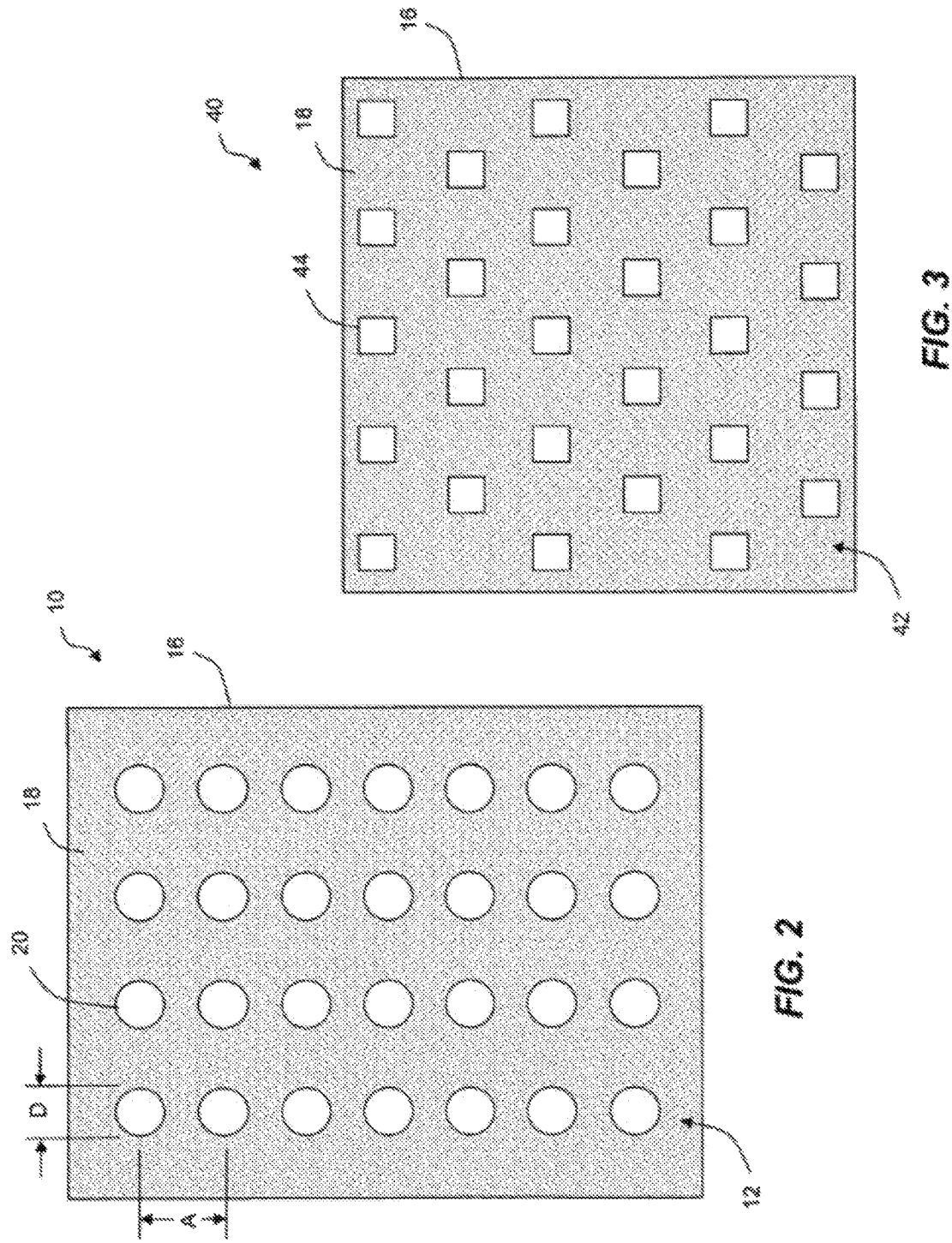

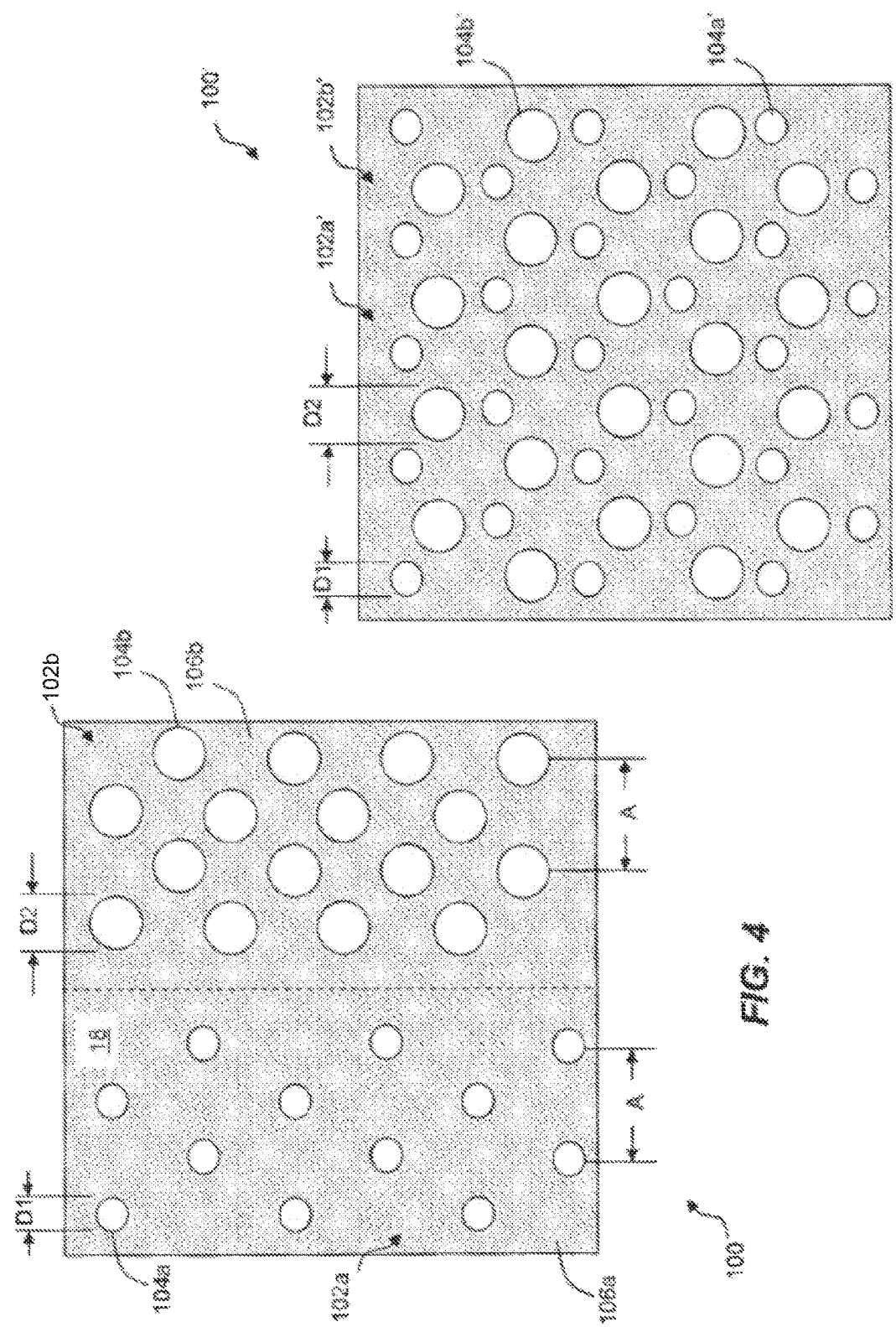

MULTIBAND WAVELENGTH SELECTIVE STRUCTURE

CROSS REFERENCE TO RELATED APPLICATIONS

This patent application is a national phase filing under 35 U.S.C. § 371 of International Application No. PCT/US2015/058913, titled "Multiband Wavelength Selective Structure," filed Nov. 4, 2015, which claims the benefit of U.S. provisional application No. 62/075,094, titled "Multiband Wavelength Selective Structure," filed Nov. 4, 2014, both of which are incorporated herein by reference in their entireties.

FIELD OF THE APPLICATION

The present application relates generally to wavelength selective surfaces based on plasmonic surface structures, and more particularly wavelength selective surfaces with a plurality of resonances.

BACKGROUND

Frequency selective surfaces can be provided to selectively reduce reflections from incident electromagnetic radiation. Such surfaces may be employed in signature management applications to reduce radar returns. These applications are typically employed within the radio frequency portion of the electromagnetic spectrum.

The use of multiple frequency selective surfaces disposed above a ground plane, for radio frequency applications, is described in U.S. Pat. No. 6,538,596 to Gilbert. Gilbert relies on the multiple frequency selective surfaces providing a virtual continuous quarter wavelength effect. Such a quarter wavelength effect results in a canceling of the fields at the surface of the structure. Thus, although individual layers may be spaced at less than one-quarter wavelength (e.g., $\lambda/12$ or $\lambda/16$), Gilbert relies on macroscopic (far field) superposition of resonances from three of four sheets, such that the resulting structure thickness will be on the order of one-quarter wavelength.

The use of electrically conductive surface elements to create a tunable absorptive structures/devices is described in U.S. Pat. No. 7,956,793 to Puscasu et al. Puscasu uses a single conductive layer with a plurality of surface elements to create a tunable primary resonance related to the size of the surface elements. A less efficient secondary resonance is defined by the center-to-center spacing of the plurality of surface elements. The resonances of Puscasu are created in the visible and infrared portion of the electromagnetic spectrum.

SUMMARY

The inventors have recognized and appreciated that there is a need for a wavelength selective structure in the visible and infrared portion of the electromagnetic spectrum with a plurality of highly absorptive and/or reflective resonances.

Accordingly, some embodiments are directed to a structure for selectively reflecting or absorbing, electromagnetic visible or infrared radiation. The structure includes a wavelength selective surface with a plurality of layers, including a compound layer forming a plurality of surface elements, an electrically isolating intermediate layer, wherein the compound layer is in contact with a first surface of the electrically isolating intermediate layer, and a continuous electrically conductive layer in contact with a second surface of the electrically isolating intermediate layer. The compound layer includes at least one metallic layer and at least one dielectric layer. The wavelength selective surface has at least one resonance band for selectively reflecting or absorbing, visible or infrared radiation based on a resonant electromagnetic coupling between the plurality of surface elements and the continuous electrically conductive layer.

Some embodiments are directed to a method of selectively reflecting or absorbing, electromagnetic radiation. The method includes providing a wavelength selective structure comprising a plurality of layers. The plurality of layers include a compound layer with a plurality of surface elements, an electrically isolating intermediate layer, wherein the compound layer is in contact with a first surface of the electrically isolating intermediate layer, and a continuous electrically conductive layer in contact with a second surface of the electrically isolating intermediate layer. The compound layer includes at least one metallic layer and at least one dielectric layer. The wavelength selective structure has at least one resonance band for selectively reflecting or absorbing, visible or infrared radiation based on a resonant electromagnetic coupling between the plurality of surface elements and the continuous electrically conductive layer. The method also includes receiving the incident electromagnetic radiation at the wavelength selective structure, absorbing a first portion of the incident electromagnetic radiation in the at least one resonant absorption band, and reflecting a second portion of the incident electromagnetic radiation outside of the at least one resonant absorption band.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 shows a top planar view of the wavelength selective surface of FIG. 1;

FIG. 3 shows a top planar view of another embodiment of a wavelength selective structure in accordance with the principles of the present invention having a hexagonal array of square surface elements;

FIG. 4 shows a top planar view of another embodiment of a wavelength selective structure having two different arrays;

FIG. 5 shows a top planar view of an alternative embodiment of the structure of FIG. 4;

DETAILED DESCRIPTION

The inventors have recognized that multilayer surface elements provided on a surface of a dielectric that is itself on a surface of a conductive layer result in multiple resonances in the visible and infrared portions of the electromagnetic spectrum. The peak wavelength, bandwidth and efficiency of the resonances may be suitably tuned by manufacturing the surface elements to have particular sizes and/or shapes, and/or to be distributed in particular arrangements on a surface, and/or by choice of the materials from which any of the layers in the structure is formed, and/or the thicknesses of any of the layers of the structure. In this way, the resonances may be matched to bands of interest for particular applications. For example, resonances may be individually tuned in the short wavelength infrared (SWIR), long wavelength infrared (LWIR), mid-wavelength infrared (MWIR), or visible portions of the electromagnetic spectrum.

In some embodiments, the resonances may be absorptive resonances and/or reflective resonances. The resonances may be "statically tuned" by selecting the characteristics of the wavelength selective structure during manufacture. For example, the types of materials used, the size of the multilayer surface elements, the distances between the multilayer surface elements, the shape of the metal layers in the multilayer surface elements, the thicknesses of the various layers in the multilayer surface elements, introduction of defects in the array of the multilayer surface elements, the shape, material, and/or thickness of any of the layers in the structure or in particular of the over layer that covers the multilayer surface elements may be selected such that one or more of the resonances have the desired characteristics.

In some embodiments, the surface elements are raised "patches" that are disposed on an electrically insulating intermediate layer. In other embodiments, the surface elements are holes formed in a multilayer compound layer. In some embodiments, a first portion of surface elements may be holes while a second portion of the surface elements may be patches.

Figure 1:
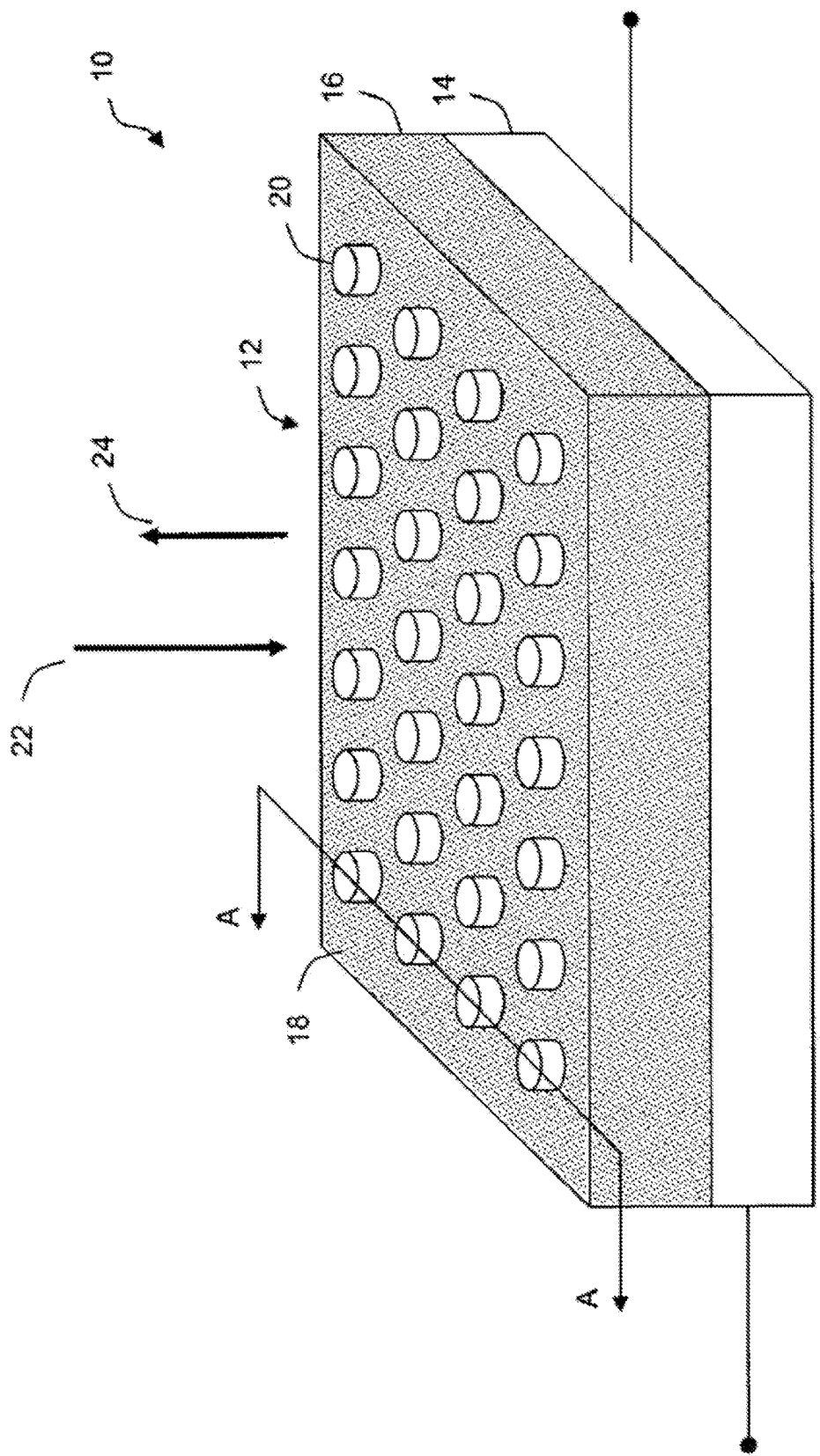
FIG. 1 shows a top perspective view of one embodiment of a wavelength selective structure having a rectangular array of surface elements.

FIG. 1 illustrates a wavelength selective structure 10 according to some embodiments of the present application. The wavelength selective structure 10 includes at least three distinguishable layers. The first layer is an compound layer 12 including an arrangement of surface elements 20. The compound layer 12 includes a plurality of layers not shown in FIG. 1, but discussed in detail below. The surface elements 20 of the compound layer 12 are disposed at a height above an inner layer including a continuous electrically conductive sheet, or ground layer 14. The arrangement of surface elements 20 and ground layer 14 is separated by an intermediate layer 16 disposed there between. At least one function of the intermediate layer 16 is to maintain a physical separation between the arrangement of surface elements 20 and the ground layer 14. The intermediate layer 16 also provides at least some electrical isolation between the compound layer 12 and the ground layer 14.

In some embodiments, wavelength selective structure 10 is exposed to incident electromagnetic radiation 22. A variable portion of the incident radiation 22 is coupled to the wavelength selective structure 10. The level of coupling may depend at least in part upon the wavelength of the incident radiation 22 and a resonant wavelength of the wavelength selective structure 10, as determined by related design parameters. Radiation coupled to the wavelength selective structure 10 can also be referred to as absorbed radiation. At other non-resonant wavelengths, a substantial portion of the incident radiation is reflected 24.

In more detail, the compound layer 12 includes multiple discrete surface features, such as the surface elements 20 arranged in a pattern along a surface 18 of the intermediate layer 16. In some embodiments, the discrete nature of the arrangement of surface features 20 requires that individual surface elements 20 are isolated from each other. In these embodiments, there is no interconnection between surface elements. However, embodiments are not so limited. In other embodiments there may be one or more interconnections of two or more individual surface elements 20 by electrically conducting paths. Though not illustrated in FIG. 1, two or more individual surface elements may be connected electrically to form a composite surface element which gives rise to a new resonance. For example, two or more individual surface elements may be connected by at least one metal interconnection. Alternatively, the interconnection between the two or more individual surface elements may be formed from the same compound layers as the individual surface elements themselves.

The compound layer 12 including an arrangement of surface elements 20 is typically flat, having a smallest dimension, height, measured perpendicular to the intermediate layer surface 18. However, embodiments are not limited to have a flat arrangement of surface elements 20. In other embodiments, a first portion of the surface elements 20 may have a first height and a second portion of the surface elements 20 may have a second height different from the first height. In general, each surface element 20 defines a surface shape and a height or thickness measured perpendicular to the intermediate layer surface 18. In general, the surface shape can be any shape, such as closed or open curves, regular polygons, irregular polygons, star-shapes having three or more legs, and other closed structures bounded by piecewise continuous surfaces including one or more curves and lines. In some embodiments, the surface shapes can include annular features, such as ring shaped patch with an open center region. More generally, the annular features have an outer perimeter defining the outer shape of the patch and an inner perimeter defining the shape of the open inner region of the patch. Each of the outer an inner perimeters can have a similar shape, as in the ring structure, or a different shape. Shapes of the inner and outer perimeters can include any of the closed shapes listed above (e.g., a round patch with a square open center). A non-exhaustive list of possible shapes include: a circle; an ellipse; an annular ring; a rectangle; a square; a square ring; a triangle; a hexagon; an octagon; parallelogram; a cross; a Jerusalem cross; a double circle; an open annular ring; and an open square ring.

While FIG. 1 illustrates all surface elements having the same shape, size, spacing number of layers, material types and layer thicknesses, in some embodiments, the shape, size and spacing, the number of layers, the material types and the layer thicknesses of the surface elements may differ from surface element to surface element. For example, some embodiments may include two superimposed periodic patterns of surface elements, each periodic pattern associated with a different set of characteristics. In other embodiments, defects may be introduced to an array of surface elements by, for example, slightly displacing every Nth surface element with respect to the periodicity of the array and/or using a different size or shape surface element for every Nth surface element. In other embodiments, every Nth surface element may be a different size (slightly larger or smaller), a different shape, a different material, or a different thickness. Such defects may add one or more resonances and/or affect the properties of resonances that exist absent said defect. In general, not all surface elements have to be the same in composition, shape, size or material. Additionally, not all surface elements have to be the same type. For example, a first portion of the surface elements may be patches while a second portion of the elements may be holes.

Also, as later described in connection with FIG. 7A-8D the layers within each surface element may have the same size and shape. However, embodiments are not so limited. In some embodiments, within each surface element, the different layers may have different shapes and sizes. For example, a first metal layer of a surface element may be larger in diameter than a second metal layer of the same surface element. Additionally, the first metal layer and/or the dielectric layers may be a different shape from the second metal layer of the surface element.

Each of the surface elements 20 may include multiple layers comprising electrically conductive materials, dielectric materials, and/or semiconductor materials. For example, in some embodiments, the surface elements 20 are formed in a compound layer that comprises alternating layers of dielectric and metal layers.

The conductive materials may include, but are not limited to, ordinary metallic conductors, such as aluminum, copper, gold, silver, iron, nickel, tin, lead, platinum, titanium, tantalum and zinc; combinations of one or more metals in the form of superimposed multilayers or a metallic alloy, such as steel; and ceramic conductors such as indium tin oxide and titanium nitride. In some embodiments, the electrically conductive material may include a metallic-like material, such as a heavily doped semiconductors doped with one or more impurities in order to increase the electrical conductivity.

The semiconductor materials of the surface elements 20 may include, but are not limited to: silicon and germanium; compound semiconductors such as silicon carbide, gallium-arsenide and indium-phosphide; and alloys such as silicon-germanium and aluminum-gallium-arsenide.

The dielectric materials of the surface elements 20 may be formed from an electrically insulative material. Some examples of dielectric materials include silicon dioxide (SiO2); alumina (Al2O3); aluminum oxynitride; silicon nitride (Si3N4). Other exemplary dielectrics include polymers, rubbers, silicone rubbers, cellulose materials, ceramics, glass, and crystals. Dielectric materials also include: semiconductors, such as silicon and germanium; compound semiconductors such as silicon carbide, gallium-arsenide and indium-phosphide; and alloys such as silicon-germanium and aluminum-gallium-arsenide; and combinations thereof The ground layer 14 may be formed from any one of the aforementioned electrically conductive materials.

The intermediate layer 16 can be formed from any one of the aforementioned electrically insulative materials. As dielectric materials tend to concentrate an electric field within themselves, an intermediate dielectric layer 16 may do the same, concentrating an induced electric field between each of the surface elements 20 and a proximal region of the ground layer 14. Beneficially, such concentration of the electric-field tends to enhance electromagnetic coupling of the arrangement of surface elements 20 to the ground layer 14.

Dielectric materials can be characterized by parameters indicative of their physical properties, such as the real and imaginary portions of the index of refraction, often referred to as "n" and "k." Although constant values of these parameters n, k can be used to obtain an estimate of the material's performance, these parameters are typically wavelength dependent for physically realizable materials. In some embodiments, the intermediate layer 16 includes a so-called high-k material. Examples of such materials include oxides, which can have k values ranging from 0.001 up to 10.

The arrangement of surface elements 20 can be configured in a non-array arrangement, or array on the intermediate layer surface 18. Referring now to FIG. 2, the wavelength selective structure 10 includes an array of surface elements 20, each surface element 20 being part of a compound layer 12. Multiple surface elements 20 are arranged in a square grid along the intermediate layer surface 18. A square grid or matrix arrangement is an example of a regular array, meaning that spacing between adjacent surface elements 20 is substantially uniform. Other examples of regular arrays, or grids include hexagonal grids, triangular grids, oblique grids, centered rectangular grids, and Archimedean grids. In some embodiments, the arrays can be irregular and even random. Each of the individual elements 20 may or may not have substantially the same shape, such as the circular shape shown.

Although flattened elements are shown and described, other shapes are possible. For example, each of the multiple surface elements 20 can have non-flat profile with respect to the intermediate layer surface 18, such as a parallelepiped, a cube, a dome, a pyramid, a trapezoid, or more generally any other shape. In this way, a first metal layer that is at a first height within the surface element 20 may have a different size than a second metal layer that is at a second height within the same surface element 20. One advantage of some embodiments over other prior art surfaces is a relaxation of fabrication tolerances. The high field region resides underneath each of the multiple surface elements 20, between the surface element 20 and a corresponding region of the ground layer 14. The surface elements also couple between themselves yielding to different resonances that could be more influenced by the distance between the different surface elements.

In more detail, each of the circular elements 20 illustrated in FIG. 2 has a respective diameter D. In some embodiments, this diameter D is the "size" of the surface elements. In the exemplary square grid, each of the circular elements 20 is separated from its four immediately adjacent surface elements 20 by a uniform grid spacing A measured center-to-center. In some embodiments, this distance A is the "spacing" between the surface elements. Embodiments, however, are not limited to a single size and a single spacing. For example, a first regular grid of surface elements with a first spacing and a first shape may be superimposed over a second regular grid of surface elements with a second spacing and a second shape. In this way, a plurality of resonances may be created.

FIG. 3 shows an alternative embodiment of a wavelength selective structure 40 including a hexagonal arrangement, or array, of surface elements 42. Each of the discrete surface elements includes a square surface element 44 having a side dimension D'. In some embodiments, this side dimension D' is the "size" of the surface elements. Center-to-center spacing between immediately adjacent elements 44 of the hexagonal array 42 is about A'. In some embodiments this distance A' is the "spacing" of the surface elements. For forming a resonance in the infrared portion of the electromagnetic spectrum, the diameter D' may be, for example, between about 0.5 microns for near infrared and 50 microns for the far infrared and terahertz, understanding that any such limits are not firm and will vary depending upon such factors as the index of refraction (n), the index of absorption (k), and the thickness of layers.

Array spacing A can be as small as desired, as long as the surface elements 20 do not touch each other. Thus, a minimum spacing will depend to some extent on the dimensions of the surface feature 20. Namely, the minimum spacing must be greater than the largest diameter of the surface elements (i.e., A>D). The surface elements can be separated as far as desired, although absorption response may suffer from increased grid spacing as the fraction of the total surface covered by surface elements falls below 10%. Accordingly, in some embodiments, the total surface covered by the surface elements is greater than 10%, greater than 15%, or greater than 20%.

In some embodiments, more than one arrangement of uniform-sized features are provided along the same outer compound layer of a wavelength selective surface. Shown in FIG. 4 is a plan view of one such wavelength selective structure 100 having two different arrangements of surface features 102a, 102b (generally 102) disposed along the same surface. The first arrangement 102a includes a triangular array, or grid, of uniform-sized circular patches 104a, each having a diameter D1 and separated from its nearest neighbors by a uniform grid spacing A. Similarly, the second arrangement 102b includes a triangular grid of uniform-sized circular patches 104b, each having a diameter D2 and separated from its nearest neighbors by a uniform grid spacing A. Visible between the circular patches 104a, 104b is an outer surface 18 of the intermediate layer. Each of the arrangements 102a, 102b occupies a respective, non-overlapping region 106a, 106b of the intermediate layer surface 18. Except for there being two different arrangements 102a, 102b on the same surface 18, the wavelength selective structure 100 is substantially similar to the other wavelength selective structures described hereinabove. That is, the wavelength selective structure 100 also includes a ground plane 14 (not visible in this view) and an intermediate insulating layer 16 disposed between the ground plane 14 and a bottom surface of the circular patches 104a, 104b.

Each of the different arrangements 102a, 102b is distinguished from the other by the respective diameters of the different circular patches 104a, 104b (i.e., D2>D1). Other design attributes including the shape (i.e., circular), the grid format (i.e., triangular), and the grid spacing of the two arrangements 102a, 102b are substantially the same. Other variations of a multi-resonant structure are possible with two or more different surface arrangements that differ from each other according to one or more of: shape; size; grid format; spacing; and choice of materials. Size includes thickness of each of the multiple layers 14, 16, 102 of the wavelength selective structure 100. Different materials can also be used in one or more of the regions 106a, 106b. For example, an arrangement of gold circular patches 102a in one region 106a and an arrangement of aluminum circular patches 102b in another region 106b.

In operation, each of the different regions 106a, 106b will respectively contribute to a different resonance from the same wavelength selective structure 100. Thus, one structure can be configured to selectively provide a resonant response to incident electromagnetic radiation within more than one spectral regions. Such features are beneficial in IR applications in which the wavelength selective structure 100 provides resonant absorption peaks in more than one IR band. Thus, a first resonant peak can be provided within a 3-5 micrometer IR band, while a second resonant peak can be simultaneously provided within a 7-14 micrometer IR band, enabling the same structure to be simultaneously visible to IR detectors operating in either of the two IR bands.

In some embodiments, the different arrangements 102a' and 102b' can overlap within at least a portion of the same region. One embodiment, shown in FIG. 5, includes a substantially complete overlap, in which a first arrangement 102a' includes a triangular grid of uniform-sized circular patches 104a' of a first diameter D1, interposed within the same region with a second arrangement 102b' including a triangular grid of uniform-sized circular patches 104b' of a second diameter D2. Each arrangement 102a', 102b' has a grid spacing of A. When exposed to incident electromagnetic radiation, wavelength selective structure 100' will produce more than one resonant features, with each resonant feature corresponding to a respective one of the different arrangements 102a', 102b'. As with the previous example, one or more of the parameters including: shape; size; grid format; spacing; and choice of materials can be varied between the different arrangements 102a', 102b'.

In yet other embodiments (not shown), structures similar to those described above in relation to FIG. 4 and FIG. 5 are formed having a complementary surface. Thus, a single structure may include two or more different arrangements of through holes formed in a compound layer above and isolated from a common ground layer. One or more of the through-hole size, shape, grid format, grid spacing, thickness, and materials can be varied to distinguish the two or more different arrangements. Once again, the resulting structure exhibits at least one respective resonant feature for each of the two or more different arrangements.

Figure 6:
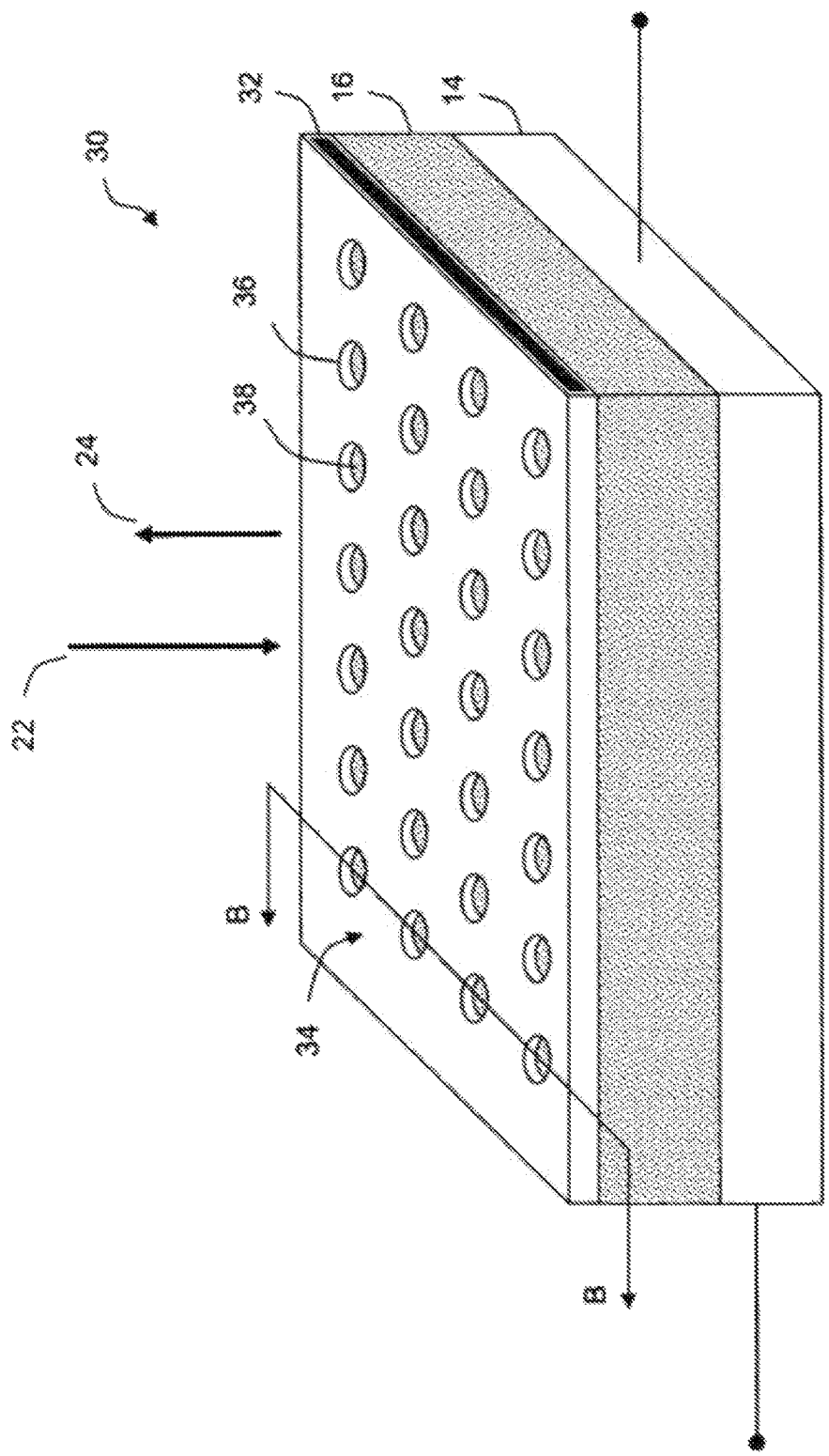
FIG. 6 shows a top perspective view of an alternative embodiment of a wavelength selective structure having apertures defined in a compound layer.

An example embodiment of an alternative family of wavelength selective structures 30 is shown in FIG. 6. The alternative wavelength selective structures 30 also include an intermediate layer 16 stacked above a ground layer 14. However, a compound layer 32, comprising at least one metal layer and at least one dielectric layer, includes a complementary feature 34. The complementary feature 34 included in the compound layer 32 defines an arrangement of through apertures, holes, or perforations.

The compound layer 32 may be formed having a uniform thickness. The arrangement of through apertures 34 includes multiple individual through apertures 36, each exposing a respective surface region 38 of the intermediate layer 16. Each of the through apertures 36 forms a respective shape bounded by a closed perimeter formed within the compound layer 32. Shapes of each through aperture 36 include any of the shapes described above in reference to the surface elements 20 (FIG. 1), 44 (FIG. 3).

Additionally, the through apertures 36 can be arranged according to any of the configurations described above in reference to the surface elements 20, 44. This includes a square grid, a rectangular grid, an oblique grid, a centered rectangular grid, a triangular grid, a hexagonal grid, and random grids. Thus, any of the possible arrangements of surface elements 36 and corresponding exposed regions of the intermediate layer surface 18 can be duplicated in a complementary sense in that the surface elements 20 are replaced by through apertures 36 and the exposed regions of the intermediate layer surface 18 are replaced by the compound layer 32.

Figure 7A:
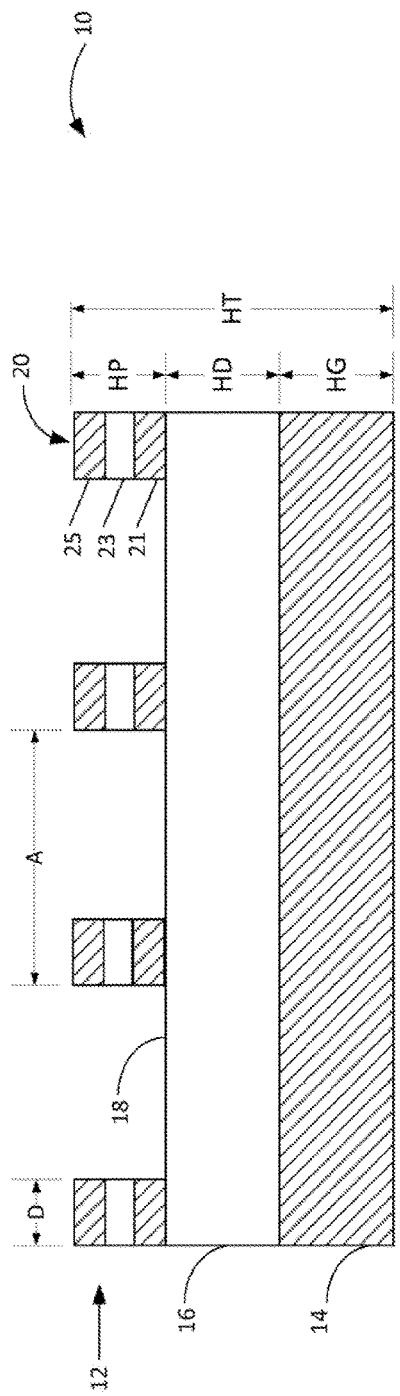
FIG. 7A shows a cross-sectional elevation view of the wavelength selective structure of FIG. 1 taken along A-A.
Figure 7B:
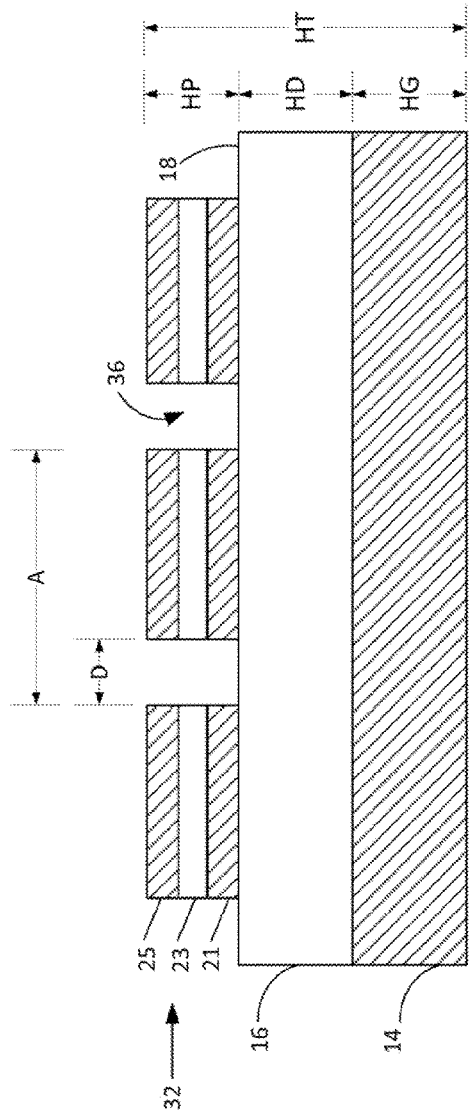
FIG. 7B shows a cross-sectional elevation view of the wavelength selective structure of FIG. 6 taken along B-B.

A cross-sectional elevation view of the wavelength selective structure 10 is shown in FIG. 7A. The electrically conductive ground layer 14 has a substantially uniform thickness HG. The intermediate layer 16 has a substantially uniform thickness HD, and the compound layer 12, comprising a plurality of surface elements 20 has a substantially uniform thickness HP. The different layers 12, 14, 16 can be stacked without gaps therebetween, such that a total thickness HT of the resulting wavelength selective structure 10 is substantially equivalent to the sum of the thicknesses of each of the three individual layers 14, 16, 12 (i.e., HT=HG+HD+HP). A cross-sectional elevation view of the complementary wavelength selective structure 30 is shown in FIG. 7B and includes a similar arrangement of the three layers 14, 16, 32.

Both compound layer 12 and compound layer 32 include a first metal layer 21, a dielectric layer 23 and a second metal layer 25. However, embodiments are not limited by this number of metal and dielectric layers. In some embodiments, compound layer 12 and compound layer 32 may include three, four, five or more metal layers. Each metal layer may be separated by at least one dielectric layer. In some embodiments, each of the plurality of metal layers may be formed from a different metal and each dielectric layer may be formed from different dielectric materials. In other embodiments, some of the metal layers may be formed from the same metal material and some of the dielectric layers may be formed from the same dielectric material. Each of the individual metal layers 21 and 25 and the dielectric layer 23 may have a different thickness, or height, as determined by the design of the wavelength selective structure 10. Additionally, each of the layers is not limited to having a constant thickness. Any one of the layers may have a thickness that varies within each surface element or between surface elements.

Figure 7C:
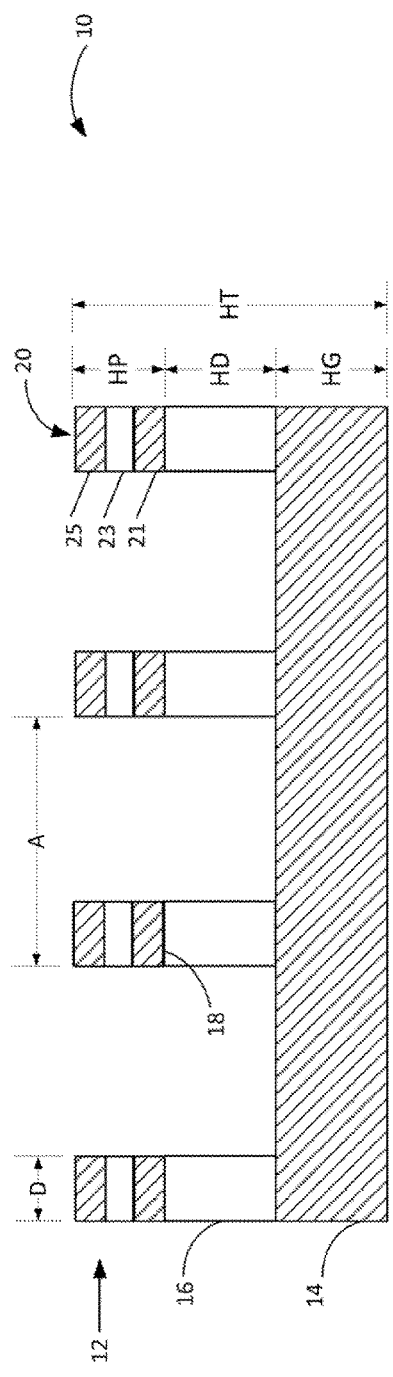
FIG. 7C shows a cross-sectional elevation view of an alternative embodiment of a wavelength selective structure with the intermediate layer only under the surface elements.

In some embodiments, the intermediate insulating layer has a non-uniform thickness with respect to the ground layer. For example, the intermediate layer may have a first thickness HD under each of the discrete conducting surface elements and a different thickness, or height at regions not covered by the surface elements. It is important that a sufficient layer of insulating material be provided under each of the surface elements to maintain a design separation and to provide isolation between the surface elements and the ground layer. In at least one example, the insulating material can be substantially removed at all regions except those immediately underneath the surface elements. An example of this embodiment is illustrated in FIG. 7C, illustrating the intermediate layer 16 separated into a plurality of discrete elements directly under each surface element. In other embodiments, the insulating layer can include variations, such as a taper between surface elements. At least one benefit of the inventive design is a relaxation of design tolerances that results in a simplification of fabrication of the structures.

The thickness chosen for each of the respective layers 12, 32, 16, 14 (HP, HD, HG) and the thickness of each of metal layers 21 and 25 and dielectric layer 23 can be independently varied for various embodiments of the wavelength selective surfaces 10, 30. For example, the ground plane 14 can be formed relatively thick and rigid to provide a support structure for the intermediate and compound layers 16, 12, 32. Alternatively, the ground plane 14 can be formed as a thin layer, as long as a thin ground plane 14 forms a substantially continuous electrically conducting layer of material providing the continuous ground. Preferably, the ground plane 14 is at least as thick as one skin depth within the spectral region of interest. In some embodiments, the ground plane 14 may be opaque within the spectral region of interest. Accordingly, the transmission of electromagnetic radiation through the wavelength selective structure is zero, and the sum of the absorption and the reflection from the wavelength selective structure is equal to one. In other words, absorption and reflection are complementary. Similarly, in different embodiments of the wavelength selective surfaces 10, 30, the respective compound layer 12, 32 can be formed with a thickness HP ranging from relatively thin to relatively thick. In a relatively thin embodiment, the compound layer thickness HP can be a minimum thickness required just to render the intermediate layer surface 18 opaque. Preferably, the compound layer 12, 32 is at least as thick as one skin depth within the spectral region of interest. In some embodiments, each of metal layers 21 and 25 is at least as thick as one skin depth within the spectral region of interest.

Likewise, the intermediate layer thickness HD can be formed as thin as desired, as long as electrical isolation is maintained between the outer and inner electrically conducting layers 12, 32, 14. The minimum thickness can also be determined to prevent electrical arcing between the isolated conducting layers under the highest anticipated induced electric fields. Alternatively, the intermediate layer thickness HD can be formed relatively thick. The concept of thickness can be defined relative to an electromagnetic wavelength, $\lambda c$, of operation, or resonance wavelength. By way of example and not limitation, the intermediate layer thickness HD can be selected between about 0.01 times $\lambda c$ in a relatively thin embodiment to about 0.5 times $\lambda c$ in a relatively thick embodiment.

Figure 7D:
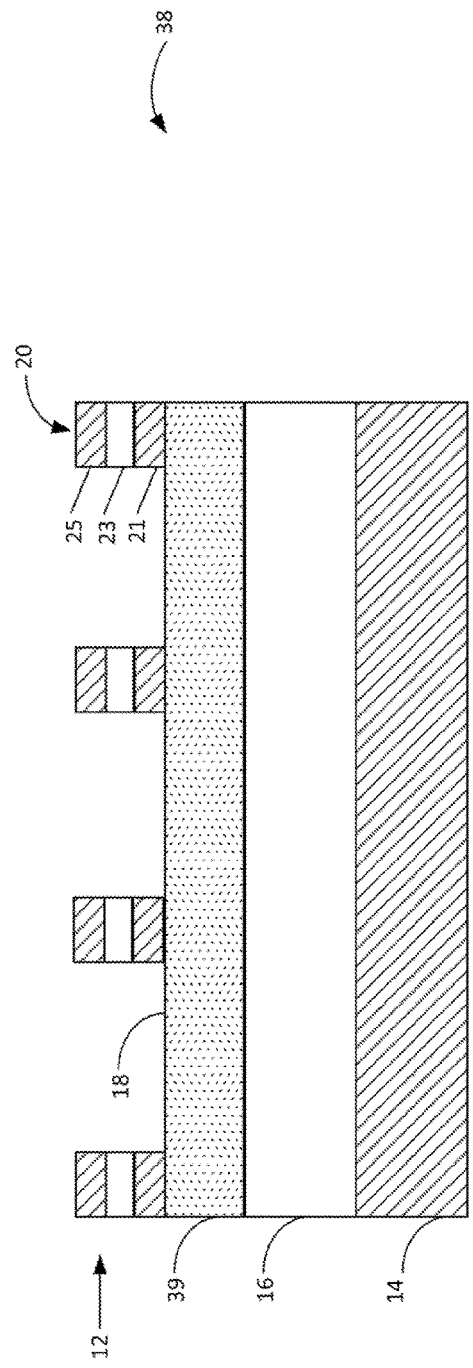
FIG. 7D shows a cross-sectional elevation view of an alternative embodiment of a wavelength selective structure having a second intermediate layer.

Referring to FIG. 7D, a cross sectional view of a wavelength selective structure 38 includes a compound layer 12 comprising a plurality of surface features 20 disposed over ground plane 14, with an intermediate insulating layer 16 disposed between the surface features 20 and the ground plane 14. The wavelength selective structure 38 also includes a second intermediate layer 39 disposed between a top surface 18 of the insulating layer and a bottom surface of the surface features 20. The second layer 39 is also an insulating material, such that the individual surface features 20 remain discrete and electrically isolated from each other with respect to a non-time-varying electrical stimulus. For example, the second intermediate layer 39 can be formed from a dielectric material chosen to have material properties n, k different than the material properties of the first intermediate layer 16. Any dielectric material can be used including any of the dielectric materials described herein. Alternatively or in addition, the second intermediate layer 39 can be formed from a semiconductor material. Any semiconductor can be used, including those semiconductor and semiconductor compounds described herein, provided that the semiconductor includes an electrically insulating mode. More generally, a fourth layer having physical properties described above in relation to the second intermediate layer 39 can be provided between any of the three layers 14, 16, 20 of the wavelength selective structure 38.

Figure 7E:
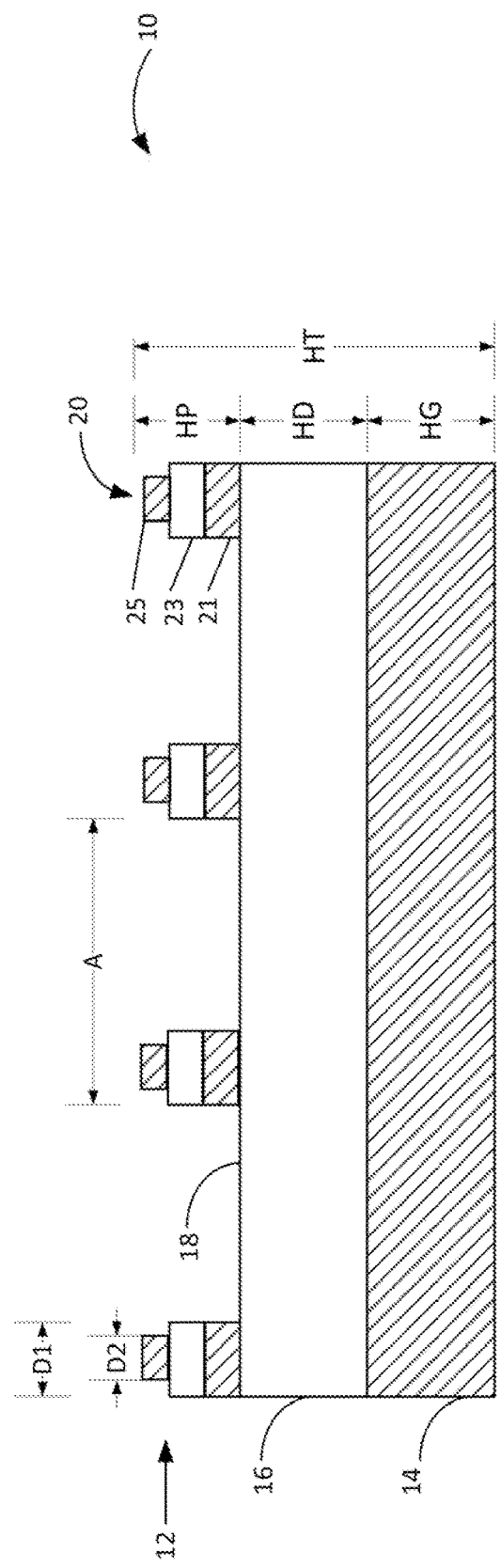
FIG. 7E shows a cross-sectional elevation view of an alternative embodiment of a wavelength selective structure with a compound layer including different size metal layers within a single surface feature.

Referring to FIG. 7E, a cross sectional view of a wavelength selective structure 10 includes a compound layer 12 comprising a plurality of surface features 20 disposed over ground plane 14, with an intermediate insulating layer 16 disposed between the surface features 20 and the ground plane 14. In this particular embodiment, each surface feature 20 includes a first metal layer 21 and a second metal layer 25, each metal layer having a different characteristic size. For example, as illustrated, the first metal layer 21 is a circular patch with a first diameter, D1, and the second metal layer 25 is a circular patch with a second diameter, D2. The dielectric layer 23 is shown having the same diameter, D1, as the first metal layer 21. However, in other embodiments, the dielectric layer 23 may have a diameter the same as the second diameter, D2. In other embodiments, the dielectric layer 23 may have a diameter, D3, less than the first diameter, D1, and greater than the second diameter, D2 (i.e., D2<D3<D1). In addition to having metal layers of different sizes within a single surface feature, in some embodiments, the shape of the first metal layer 21 may be different than the shape of the second metal layer 25. Additionally, while FIG. 7E illustrates surface features that are patches, when holes are used as surface features a similar configuration may be implemented such that the metal layers of the compound layer that is not a surface feature may have different sizes, resulting in a particular hole having different sized at different depths within the compound layer.

The wavelength selective surfaces 10, 30, 38 can be formed using standard semiconductor fabrication techniques. Thin structures can be obtained using standard fabrication techniques on a typical semiconductor substrate, which can also be transferred to other type of substrates, either flexible or rigid, such as plastics, film roll, glass, or tape.

Alternatively or in addition, the wavelength selective surfaces 10, 30, 38 can be formed using thin film techniques including vacuum deposition, chemical vapor deposition, and sputtering. In some embodiments, the compound layer 12, 32 can be formed using printing techniques. The surface features can be formed by providing a continuous electrically conductive surface layer and then removing regions of the surface layer to form a plurality of metal layers of the surface features. Regions can be formed using standard physical or chemical etching techniques. Alternatively or in addition, the surface features can be formed by laser ablation, removing selected regions of the conductive material from the surface, or by nano-imprinting or stamping, roll-to-roll printing or other fabrication methods known to those skilled in the art.

Figure 8A:
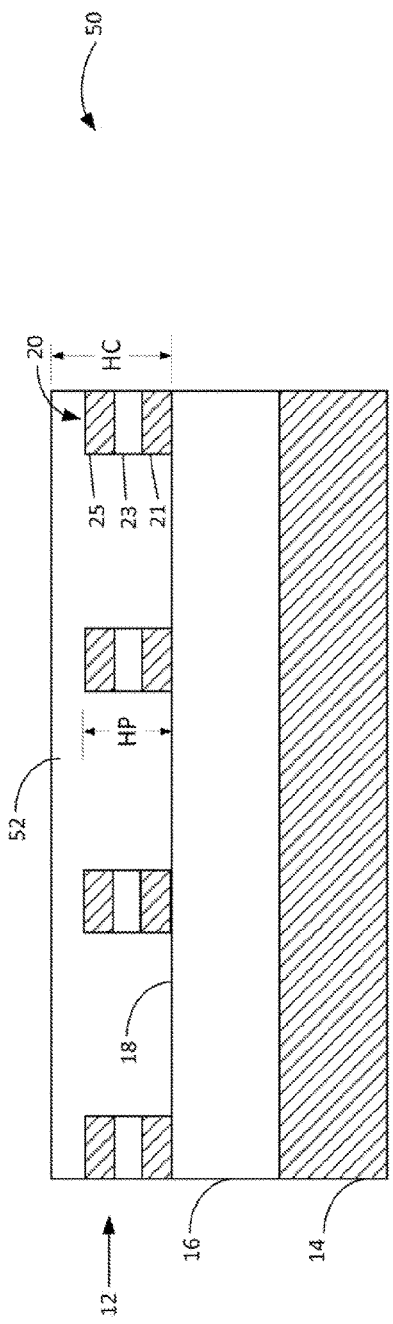
FIG. 8A shows a cross-sectional elevation view of an alternative embodiment of a wavelength selective structure having an over layer covering the compound layer.

Referring to FIG. 8A a cross-sectional elevation view of an alternative embodiment of a wavelength selective structure 50 is shown having an over layer 52. Similar to the embodiments described above, the wavelength selective structure 50 includes a compound layer 12 having an arrangement of surface elements 20 (FIG. 1) disposed at a height above a ground layer 14 and separated therefrom by an intermediate layer 16. The over layer 52 represents a fourth layer, or superstrate 52 provided on top of the compound layer 12.

The over layer 52 can be formed having a thickness HC measured from surface 18 of the intermediate layer 16 to the top surface of the over layer 52 opposite the surface 18 of the intermediate layer 16. In some embodiments, the over layer 52 thickness HC is greater than thickness of the compound layer 12 (i.e., HC>HP). The over layer 52 can be formed with uniform thickness to provide a planar external surface. Alternatively or in addition, the over layer 52 can be formed with a varying thickness, following a contour of the underlying compound layer 12.

An over layering material 52 can be chosen to have selected physical properties (e.g., k, n) that allow at least a portion of incident electromagnetic radiation to penetrate into the over layer 52 and react with one or more of the layers 12, 14, and 16 below. In some embodiments, the overlying material 52 is substantially optically transparent in the vicinity of the primary absorption wavelength, to pass substantially all of the incident electromagnetic radiation. For example, the overlying material 52 can be formed from a glass, a ceramic, a polymer, or a semiconductor. The overlaying material 52 can be applied using any one or more of the fabrication techniques described above in relation to the other layers 12, 14, 16 in addition to painting and/or dipping.

In some embodiments, the over layer 52 provides a physical property chosen to enhance performance of the wavelength selective structure in an intended application. For example, the overlaying material 52 may have one or more optical properties, such as absorption, refraction, and reflection. These properties can be used to advantageously modify incident electromagnetic radiation. Such modifications include focusing, de-focusing, and filtering. Filters can include low-pass, high-pass, band pass, and band stop.

The overlaying material 52 can be protective in nature allowing the wavelength selective structure 50 to function, while providing environmental protection. For example, the overlaying material 52 can protect the compound layer 12 from corrosion and oxidation due to exposure to moisture. Alternatively or in addition, the overlaying material 52 can protect either of the exposed layers 12, 16 from erosion due to a harsh (e.g., caustic) environment. Such harsh environments might be encountered routinely when the wavelength selective structure is used in certain applications. At least one such application that would benefit from a protective overlaying material 52 would be a marine application, in which a protective over layer 52 would protect the compound layer 12 or 32 from corrosion.

Figure 8B:
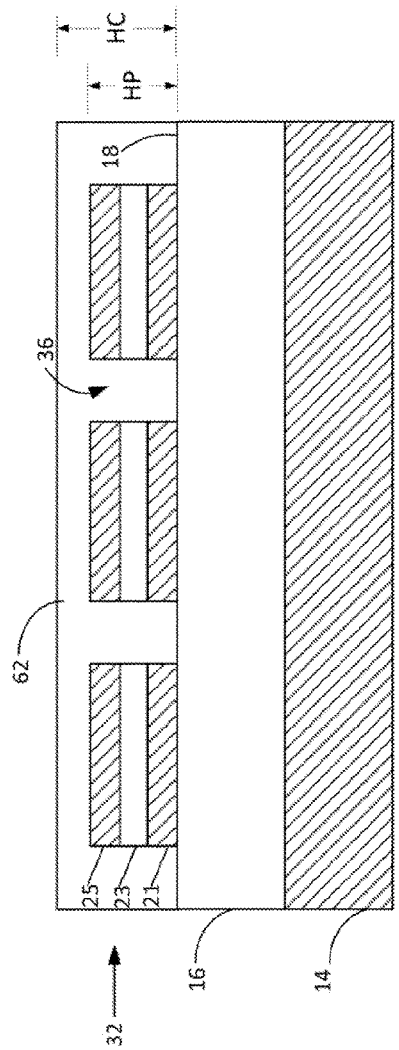
FIG. 8B shows a cross-sectional elevation view of an alternative embodiment of a wavelength selective structure having an over layer covering the compound layer.

In another embodiment shown in FIG. 8B, a wavelength selective structure 60 includes an overlying material 62 applied over a compound layer 32 defining an arrangement of through apertures 34, including individual aperture 36 (FIG. 6). The overlying material 62 can be applied with a maximum thickness HC measured from the surface 18 of intermediate layer 16 to be greater than the thickness of the compound layer 32 (i.e., HC>HP). The overlaying material 62 again can provide a planar external surface or a contour surface. Accordingly, a wavelength selective structure 60 having apertures 34 defined in a compound layer 32 is covered by an overlying material 62. The performance and benefits of such a structure are similar to those described above in relation to FIG. 8A.

Figure 8C:
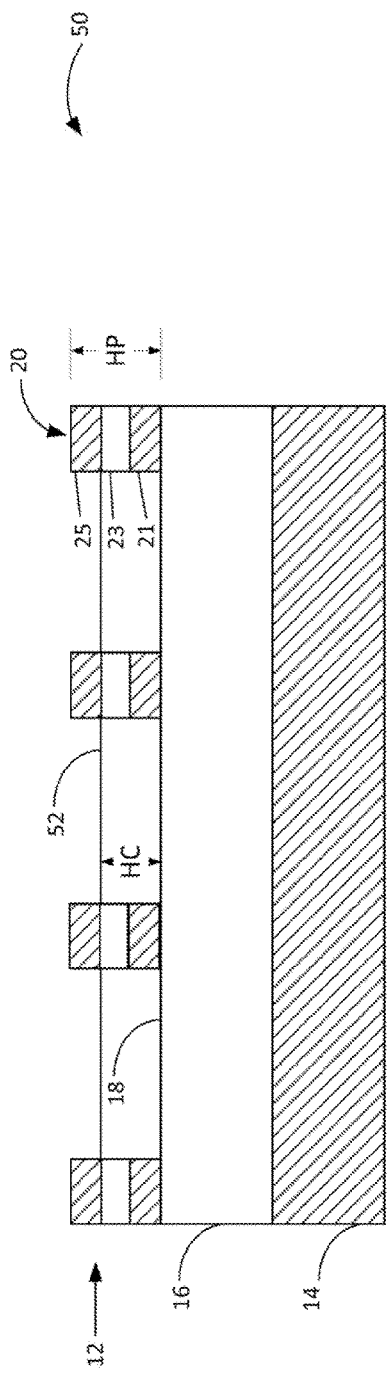
FIG. 8C shows a cross-sectional elevation view of an alternative embodiment of a wavelength selective structure having an over layer partially filling the gaps between the surface features of the compound layer.

In another embodiment shown in FIG. 8C, the overlying material 52 of the wavelength selective surface 50 does not cover the tops of the compound layer 12, but partially fills the gaps between the surface features such that it covers the intermediate layer 16 and the sides of at least a portion of the surface features. In this embodiments, the thickness of the overlying material 52 is less than the thickness of the compound layer (i.e., HC<HP). While FIG. 8C illustrates the overlying material 52 filling gaps between surface features that are patches, a similar overlying layer may be used with surface features that are holes in the compound layer. When the surface features are holes, the overlying material 52 fills the holes, which are the surface features.

Figure 8D:
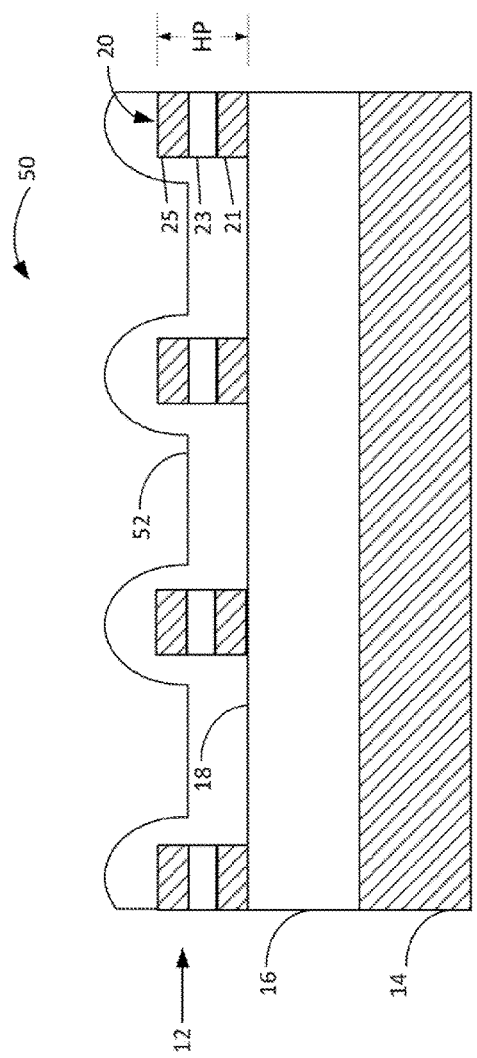
FIG. 8D shows a cross-sectional elevation view of an alternative embodiment of a wavelength selective structure having a conformal over layer covering the compound layer.

In another embodiment shown in FIG. 8D, the overlying material 52 of the wavelength selective surface 50 forms a conformal layer that conforms to the shape of the top surface of the wavelength selective surface 50. In this way, the top surface of the overlying material 52 is not flat, but becomes raised at the location of the surface features. While FIG. 8D illustrates the overlying material 52 covering surface features that are patches, a similar overlying layer may be used with surface features that are holes in the compound layer. When the surface features are holes, the overlying material 52 fills the holes and the overlying layer becomes raised at the locations where the surface features are not present.

Figure 9:
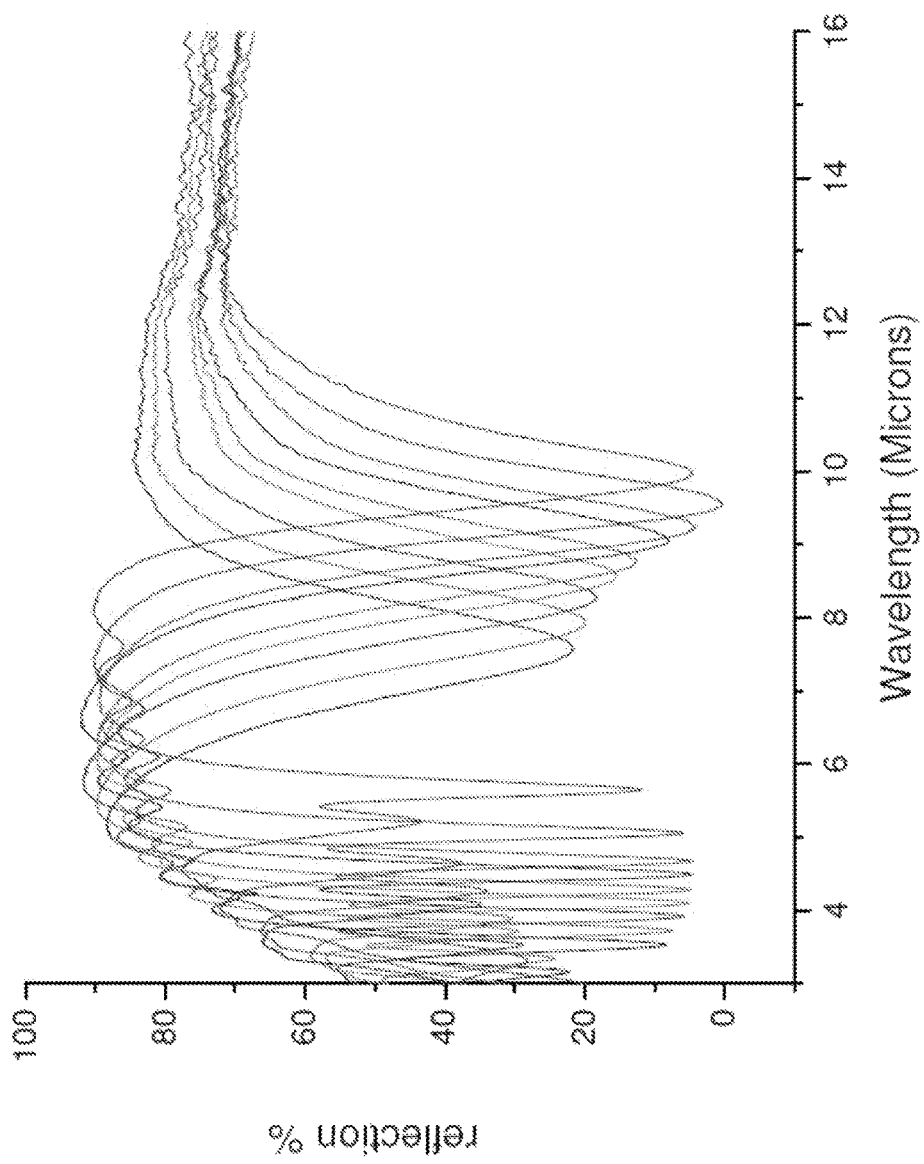
FIG. 9 shows in graphical form, example reflectivity-versus-wavelength responses and the results of varying the periodicity and size of the surface elements.

FIG. 9 illustrates example reflectivity versus wavelength response curves of a plurality of different wavelength selective surfaces according to some embodiments. Each wavelength selective structure used a different size surface feature arranged in a periodic array with different periodicities. The response curves are achieved by exposing a wavelength selective structure comprising a compound layer with a single metal layer to incident electromagnetic radiation 22 (FIG. 1) within a band including a resonance. As shown, the reflectivity to incident electromagnetic radiation varies within the range of 0% to 100%. Each individual curve exhibits two resonances with low reflection (and, therefore, high absorption). One resonance is primarily based on the periodicity of the surface elements and the other is primarily based on the size of the surface features. By tuning these parameters, properties of the resonances, such as bandwidth, magnitude, and central frequency can be adjusted.

Results supported by both computational analysis of modeled structures and measurements suggest that the higher wavelength resonance corresponds to a maximum dimension of the surface elements (e.g., a diameter of a circular patch D, or a side length of a square patch D'). As the diameter of the surface elements is increased, the wavelength of the higher wavelength resonance also increases. Conversely, as the diameter of the surface elements is decreased, the central wavelength associated with the higher wavelength resonance decreases. If at least one of the materials used within the structure exhibits material-specific resonances in the waveband of interest, these material-specific resonances could interact with the structure resonances and modify either or both the structure resonances or the material resonances.

Similarly, results supported by both computational analysis of modeled structures and measurements suggest that the wavelength associated with the lower wavelength resonance corresponds at least in part to a center-to-center spacing of the multiple surface elements. As the spacing between surface elements 20 in the arrangement of surface elements 12 is reduced, the wavelength of the lower wavelength resonance decreases. Conversely, as the spacing between the arrangement of surface elements 12 is increased, the wavelength of the lower wavelength resonance increases.

In general, the performance may be scaled to different wavelengths according to the desired wavelength range of operation. Thus, by scaling the design parameters of the wavelength selective structures as described herein, resonant performance can be obtained within any desired region of the electromagnetic spectrum. Resonant wavelengths can range down to visible light and even beyond into the ultraviolet and X-ray. At the other end of the spectrum, the resonant wavelengths can range into the terahertz band (e.g., wavelengths between about 1 millimeter and 100 microns) and even up to radio frequency bands (e.g., wavelengths on the order of centimeters to meters). Operation at the shortest wavelengths will be limited by available fabrication techniques. Current techniques can easily achieve surface feature dimensions to the sub-micron level. It is conceivable that such surface features could be provided at the molecular level using currently available and emerging nanotechnologies. Examples of such techniques are readily found within the field of molecular self-assembly.

The reflectivity curves illustrated in FIG. 9 show the results for a compound layer comprising a single metal layer. When multiple metal layers are utilized, additional resonances will be introduced to the reflectivity curves.

Figure 10:
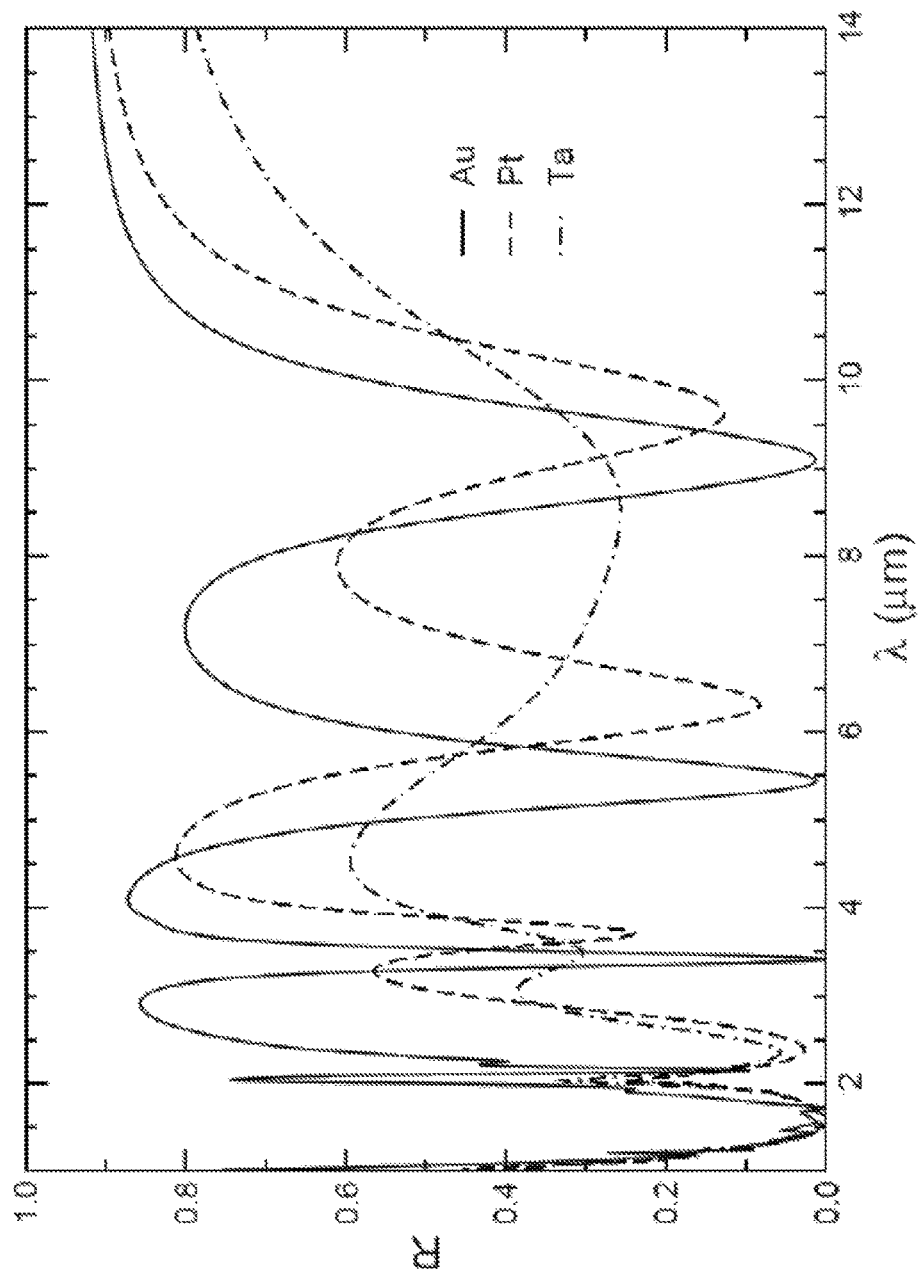
FIG. 10 shows in graphical form, example reflectivity-versus-wavelength responses and the results of varying the material of one of the layers within the structure.

FIG. 10 illustrates reflection curves associated with a wavelength selective structure similar to the one illustrated in FIG. 1, where a square array of circular patches are located above an electrically conductive ground plane. The patches comprise two different metal layers. The metal used is varied to show the effect changing the metal has on the resonances. In FIG. 10, the solid curve illustrates the reflectivity curve when surface elements include gold, the dashed curve illustrates the reflectivity curve when surface elements include platinum, and the dashed-dotted line illustrates the reflectivity curve when surface elements include tantalum.

Figure 11A:
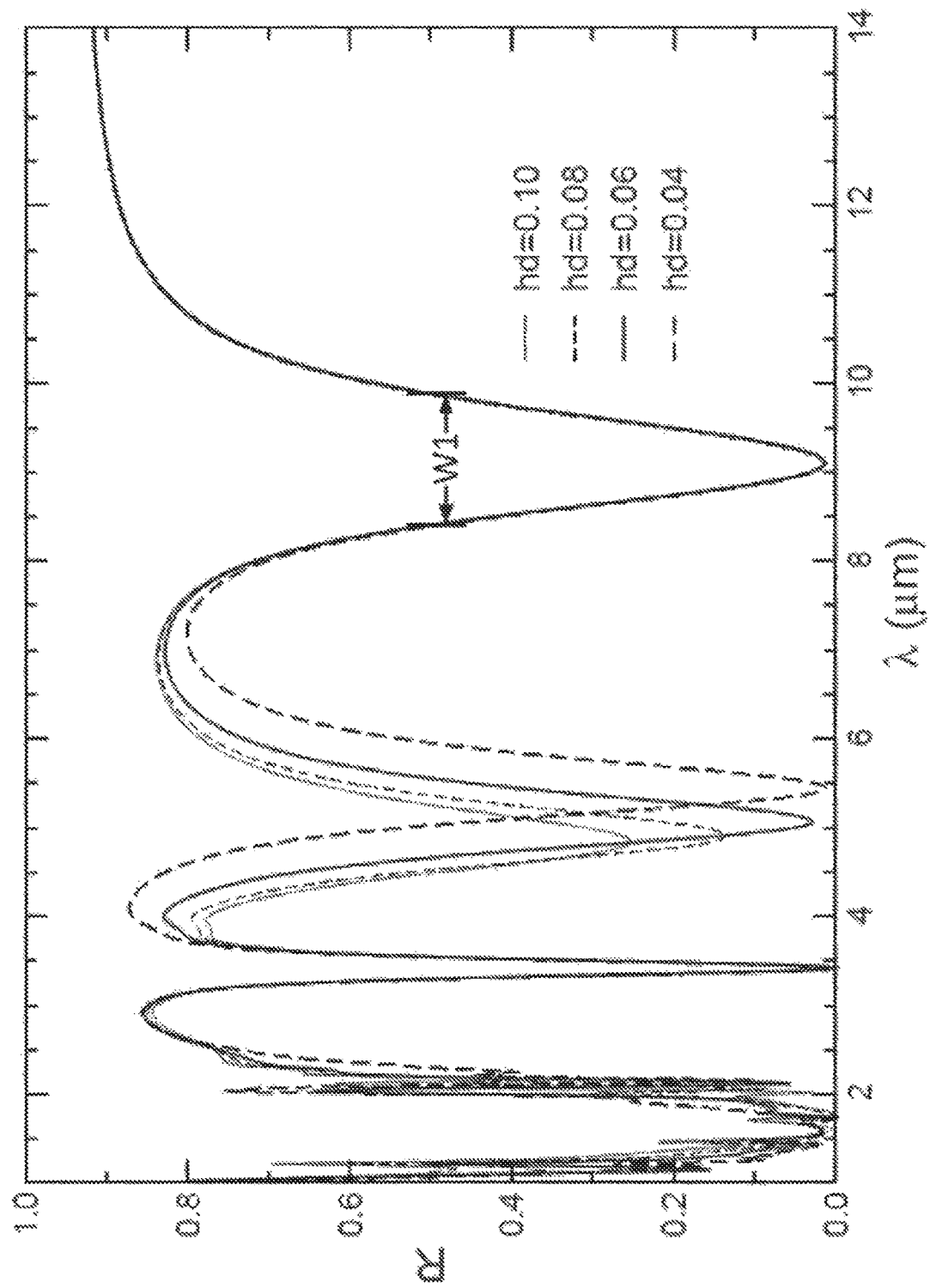
FIG. 11A shows in graphical form, example reflectivity-versus-wavelength responses and the results of varying the thickness of the dielectric intermediate layer.

FIG. 11A illustrates reflection curves associated with a wavelength selective structure similar to the one illustrated in FIG. 1, where a square array of circular patches are located above an electrically conductive ground plane. The patches comprise two different metal layers. The thickness of the dielectric intermediate layer is varied to show the effect changing the thickness of the dielectric intermediate layer has on the resonances. The reflectivity curve is obtained by exposing a wavelength selective structure 10 (FIG. 1) constructed in accordance with the principles of the present invention to incident electromagnetic radiation 22 (FIG. 1) within a band including a resonance. As shown, the reflectivity to incident electromagnetic radiation varies according to the curve within the range of 0% to 100%. Each resonance has an associated characteristic wavelength (e.g., central wavelength), amplitude and bandwidth (e.g., the right most band has a bandwidth, W1, which is approximately 1.5 micrometers. The bandwidth may be determined in any suitable way, e.g., the full-width-half-maximum (FWHM).

Results supported by both computational analysis of modeled structures and measurements suggest that the resonant wavelength associated with one or more of the resonance bands corresponds to a maximum dimension of the electrically conductive surface elements (e.g., a diameter of a circular patch D, or a side length of a square patch D'). As the diameter of the surface elements is increased, the wavelength of one or more of the resonance band also increases. Conversely, as the diameter of the surface elements is decreased, the wavelength of the resonance band 72 decreases. For example, the primary resonance on the far right of FIG. 11A may be tuned using this technique.

Figure 11B:
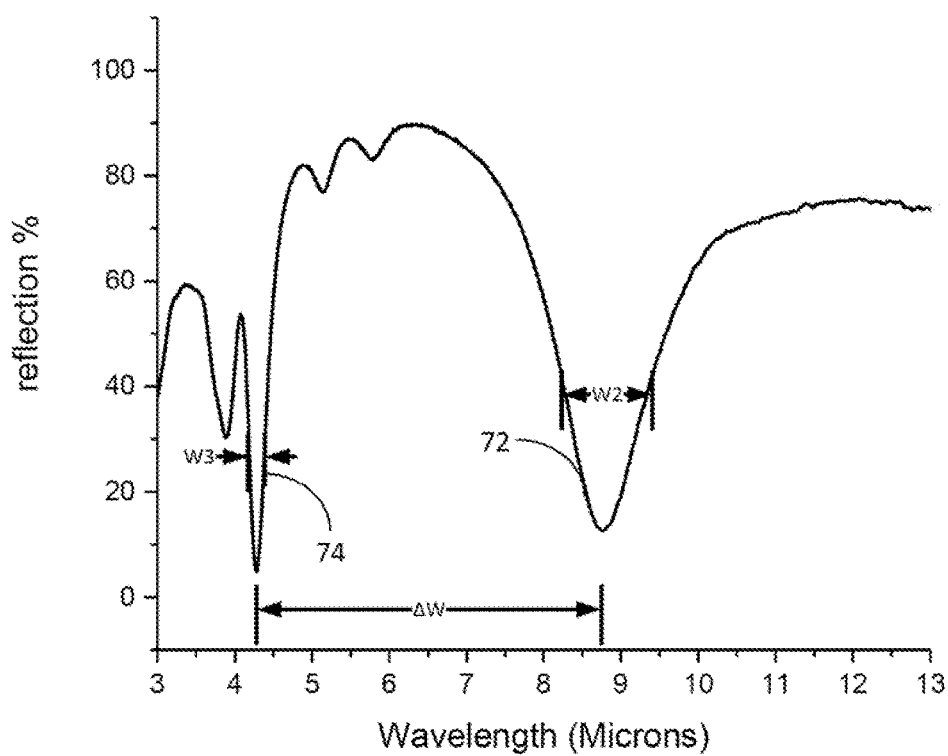
FIG. 11B shows, in graphical form, example reflectivity-versus-wavelength responses according to one dual band embodiment.
Figure 11C:
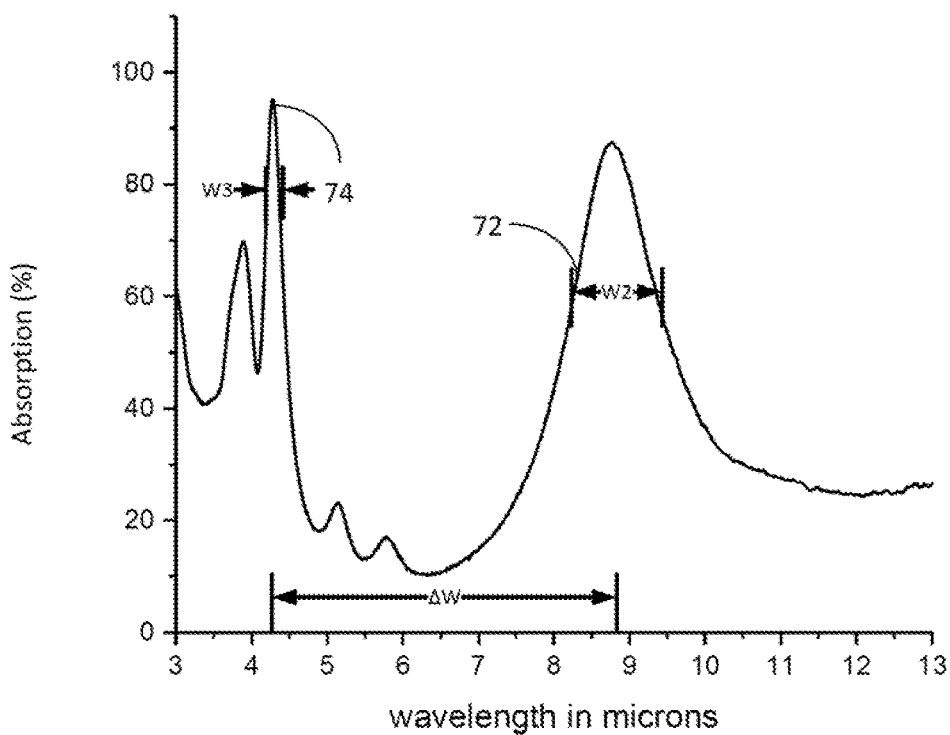
FIG. 11C shows, in graphical form, example absorption-versus-wavelength responses according to one dual band embodiment.

FIG. 11B illustrates a reflectivity response curve similar to FIG. 11A, but for a dual band structure. FIG. 11C illustrates a corresponding absorption curve for the same structure. The absorption curve in this particular embodiment is the reverse of the reflectivity curve because the sum of the reflectivity (R), transmission (T) and the absorption (A) must equal unity (R+T+A=1), and if T=0, if the structure is opaque, than A=1−R. The structure is not always completely opaque, and in some embodiments transmission doesn't have to be zero.

The second and much more pronounced dip 72 corresponds to a primary resonance of the underlying wavelength selective structure. As a result of this resonance, a substantial portion of the incident electromagnetic energy 22 is absorbed by the wavelength selective surface 10. A measure of the spectral width of the resonance response 70 can be determined as a width in terms of wavelength normalized to the resonant wavelength (i.e., $\Delta\lambda/\lambda c$ or $d\lambda/\lambda c$). Preferably, this width is determined at full-width-half-maximum (FWHM). For the exemplary curve, the width of the absorption band 72 at FWHM is less than about 1.25 microns with an associated resonance frequency of about 8.75 microns. This results in a spectral width, or $d\lambda/\lambda c$ of about 0.14. The width of the absorption band 74 at FWHM is less than about 0.25 microns with an associated resonance frequency of about 4.25 microns. This results in a spectral width, or $d\lambda/\lambda c$ of about 0.06. Generally, a $d\lambda/\lambda c$ value of less than about 0.1 can be referred to as narrowband. Thus, the exemplary resonance 74 is representative of a narrowband resonance band. In other embodiments the resonances can be broadband or a combination of narrow band and broadband. In other embodiments at least one resonance can be formed out of one, two or more resonances very closely spaced, e.g., such that the bandwidth of each resonance is wider than the wavelength separation between resonances.

Results supported by both computational analysis of modeled structures and measurements suggest that the resonant wavelength associated with the primary resonance response 72 corresponds to a maximum dimension of the electrically conductive surface elements (e.g., a diameter of a circular patch D, or a side length of a square patch D'). As the diameter of the surface elements is increased, the wavelength of the primary absorption band 72 also increases. Conversely, as the diameter of the surface elements is decreased, the wavelength of the primary absorption band 72 also decreases. The interdependence between the main resonance location and the surface elements size can be influenced, limited or enhanced by intrinsic material resonances of at least one of the materials used in the formation of the structure.

The first, dip 74 in reflectivity corresponds to a secondary absorption band of the underlying wavelength selective surface 10. Results supported by both computational analysis of modeled structures and measurements suggest that the wavelength associated with the secondary absorption band 74 corresponds at least in part to a center-to-center spacing of the multiple electrically conductive surface elements. As the spacing between surface elements 20 in the arrangement of surface elements 12 is reduced, the wavelength of the secondary absorption band 74 decreases. Conversely, as the spacing between the arrangement of surface elements 12 is increased, the wavelength of the secondary absorption band 74 increases. The secondary absorption band 74 is typically less pronounced than the primary absorption band 72 such that a change in reflectivity $\Delta R$ can be determined between the two absorption bands 74, 72. A difference in wavelength between the primary and secondary resonance bands 72, 74 is shown as $\Delta W$.

The intrinsic material resonances of at least one of the materials used in the formation of the structure can interfere with at least one of the resonances of the structure, affecting its location, bandwidth and efficiency. In turn at least one of the resonances of the structure can influence the intrinsic material resonances of at least one of the materials used in the formation of the structure.

In general, the performance may be scaled to different wavelengths according to the desired wavelength range of operation. Thus, by scaling the design parameters of any of the wavelength selective surfaces as described herein, resonant performance can be obtained within any desired region of the electromagnetic spectrum. Resonant wavelengths can range down to visible light and even beyond into the ultraviolet and X-ray. At the other end of the spectrum, the resonant wavelengths can range into the terahertz band (e.g., wavelengths between about 1 millimeter and 100 microns) and even up to radio frequency bands (e.g., wavelengths on the order of centimeters to meters). Operation at the shortest wavelengths may be limited by available fabrication techniques. Current techniques can easily achieve surface feature dimensions to the sub-micron level. It is conceivable that such surface features could be provided at the molecular level using currently available and emerging nanotechnologies. Examples of such techniques are readily found within the field of molecular self-assembly.

Figure 11D:
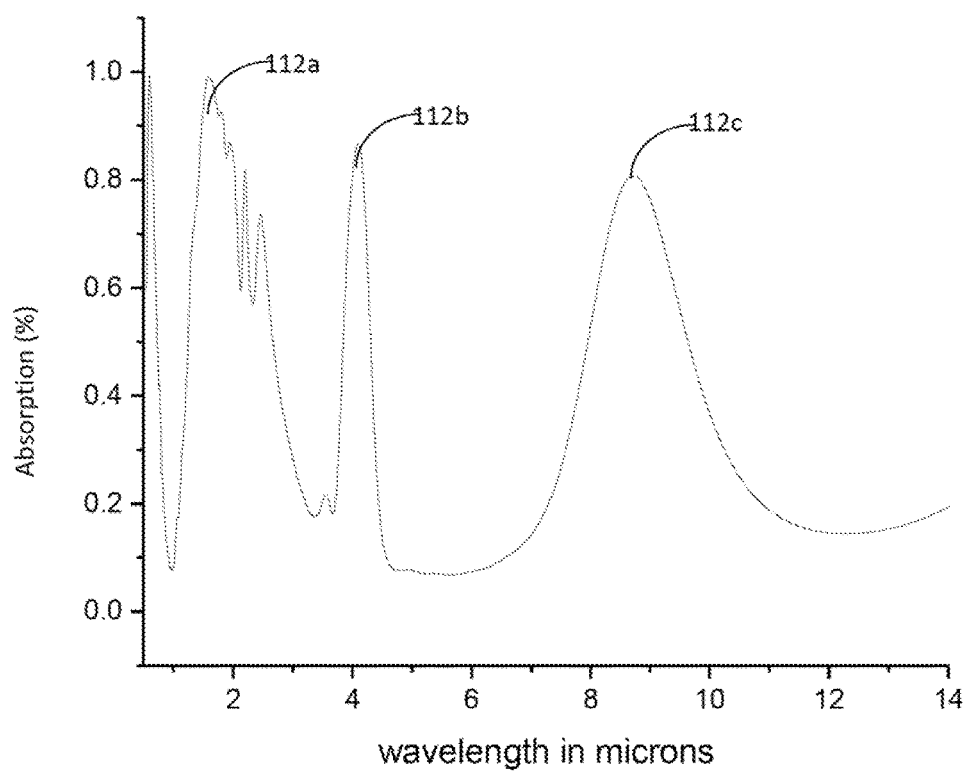
FIG. 11D shows, in graphical form, example absorption-versus-wavelength responses according to one triple band embodiment.
Figure 11E:
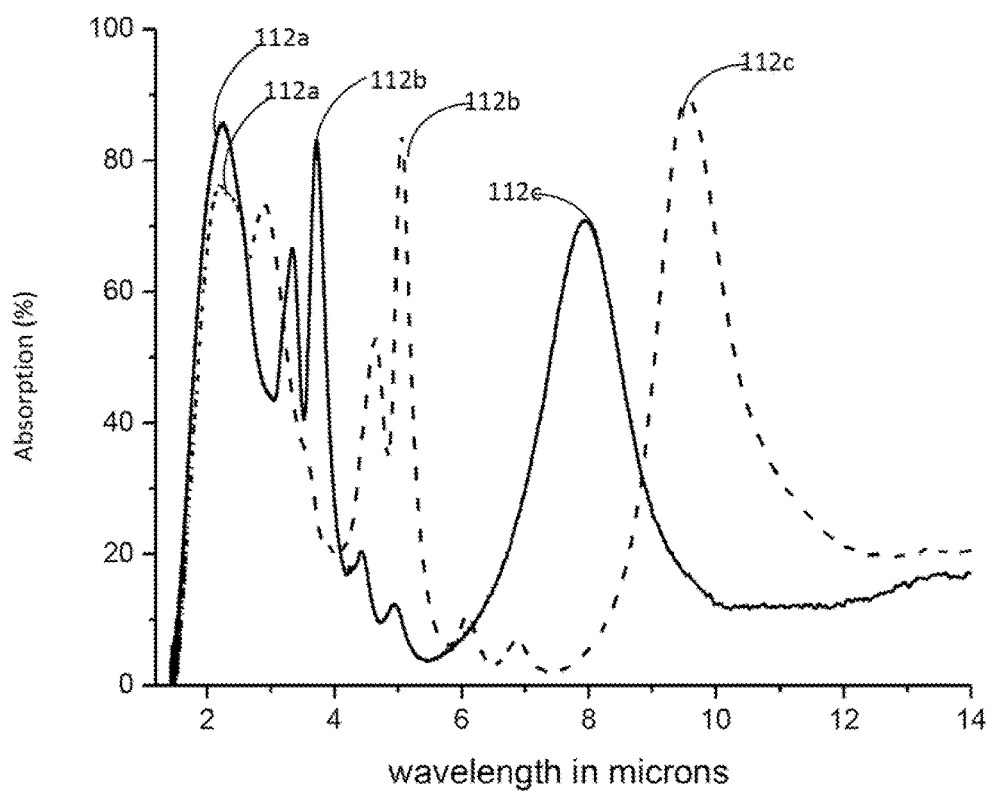
FIG. 11E shows, in graphical form, example absorption-versus-wavelength responses according to one triple band embodiment.

FIG. 11D illustrates an absorption response curve similar to FIG. 11A, but for a triple band structure. A first resonance 112$a$ occurs at about 2.0 µm and a second resonance 112$b$ occurs at about 4.0 µm and a third resonance 112$c$ occurs at about 9.0 µm. FIG. 11E illustrates a similar absorption response curve (solid line) with variation due to one or more of the material properties, the size of the surface features, and periodicity of the surface features (shown as a dashed line). A first resonance 112$a$ occurs at about 2.0 µm and does not shift in wavelength due to variation, but changes in amplitude. A second resonance 112$b$ occurs at about 4.0 µm and, after variation of one or more parameters, shifts to about 5.0 µm. A third resonance 112$c$ occurs at about 8.0 µm and shifts to about 9.5 µm after variation of one or more parameters. The third resonance 112$c$ also narrows in bandwidth and shifts to a higher amplitude after variation.

In the above curves, different selection of design parameters results in differing response curves. For example, the primary absorption band 72 of FIG. 11B-C occurs at about 8.75 microns, with wavelength range at FWHM of about 1.25 microns. This results in a spectral width $\Delta\lambda/\lambda c$ of about 0.14. A spectral width value $\Delta\lambda/\lambda c$ greater than 0.1 can be referred to as broadband. Thus, the underlying wavelength selective structure 10 can also be referred to as a broadband structure.

One or more of the physical parameters of the wavelength selective structure 10 can be varied to control reflectivity and absorption response of a given wavelength selective surface. For example, the thickness of one or more layers (e.g., surface element thickness Hp, dielectric layer thickness HD, and over layer thickness HC) can be varied. Alternatively or in addition, one or more of the materials of each of the different layers can be varied. For example, the dielectric material can be substituted with another dielectric material having a different n and k values. The presence or absence of an over layer 52 (FIG. 8A), as well as the particular material selected for the over layer 52 can also be used to vary the reflectivity or absorption response of the wavelength selective surface. Similar performance changes may be achieved by changing the material of the ground plane, change the dimension D of the surface elements, or by changing the shape of the surface elements.

In a first example, a wavelength selective surface includes an intermediate layer formed with various diameters of surface patches. The wavelength selective surface includes a triangular array of round aluminum patches placed over an aluminum film ground layer. The various surfaces are each formed with surface patches having a different respective diameter. A summary of results obtained for the different patch diameters is included in Table 1. In each of these exemplary embodiments, the patch spacing between adjacent patch elements was about 3.4 microns, and the thickness or depth of the individual patches and of the ground layer film were each about 0.1 micron. An intermediate, dielectric layer having thickness of about 0.2 microns was included between the two aluminum layers. It is worth noting that the overall thickness of the wavelength selective surface is about 0.4 microns—a very thin material. The exemplary dielectric has an index of refraction of about 3.4. Table 1 includes wavelength values associated with the resulting primary absorptions. As shown, the resonant wavelength increases with increasing patch size.

TABLE 1

Primary Absorption Wavelength Versus Patch Diameter

| Patch Diameter | Resonant Wavelength ($\lambda c$) |
|---|---|
| 1.25 μm | 4.1 μm |
| 1.75 μm | 5.5 μm |
| 2.38 μm | 7.5 μm |
| 2.98 μm | 9.5 μm |

In another example, triangular arrays of circular patches having a uniform array spacing of 3.4 microns and patch diameter of 1.7 microns are used. A dielectric material provided between the outer conducting layers is varied. As a result, the wavelength of the primary absorption shifts. Results are included in Table 2.

TABLE 2

Resonance Versus Dielectric Material

| Dielectric material | Resonant Wavelength ($\lambda c$) |
|---|---|
| Oxide | 5.8 μm |
| Nitride | 6.8 μm |
| Silicon | 7.8 μm |

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wavelength selective structure for reflecting and/or absorbing incident electromagnetic radiation, the wavelength selective structure comprising:
   a plurality of layers comprising:
      a compound layer comprising a plurality of surface elements, wherein the compound layer comprises:
         a first metallic layer;
         a first dielectric layer disposed on the first metallic layer; and
         a second metallic layer disposed on the first dielectric layer;
      an electrically isolating intermediate layer, wherein the first metallic layer of the compound layer is in contact with a first surface of the electrically isolating intermediate layer;
      a continuous electrically conductive layer in contact with a second surface of the electrically isolating intermediate layer; and
      an over layer that at least partially fills gaps between the plurality of surface elements by covering the first metallic layer and the first dielectric layer, wherein the reflecting and/or absorbing of the incident electromagnetic radiation is based at least in part on the over layer,
   wherein the wavelength selective structure has at least one resonance band for reflecting and/or absorbing the incident electromagnetic radiation.

2. The wavelength selective structure of claim 1, wherein the compound layer comprises a plurality of alternating metallic layers and dielectric layers, and wherein the electrically isolating intermediate layer comprises a dielectric and/or semiconductor layer.

3. The wavelength selective structure of claim 1, wherein a location and/or bandwidth of the at least one resonance band is based at least in part on a conductivity and/or an index of refraction of one or more of the plurality of layers.

4. The wavelength selective structure of claim 3, wherein the at least one resonance band comprises a resonance band from the mid-wavelength infrared (MWIR) portion of the electromagnetic spectrum or the long wavelength infrared (LWIR) portion of the electromagnetic spectrum.

5. The wavelength selective structure of claim 1, wherein the compound layer comprises a plurality of metallic layers and a plurality of dielectric layers, wherein the plurality of metallic layers comprises the first metallic layer and the second metallic layer, and wherein the plurality of dielectric layers comprises the first dielectric layer and a second dielectric layer.

6. The wavelength selective structure of claim 1, wherein the at least one resonance band comprises a plurality of resonance bands.

7. The wavelength selective structure of claim 6, wherein a first resonance band of the plurality of resonance bands is in the mid-wavelength infrared (MWIR) portion of the electromagnetic spectrum and a second resonance band of the plurality of resonance bands is in the long wavelength infrared (LWIR) portion of the electromagnetic spectrum.

8. The wavelength selective structure of claim 7, wherein a third resonance band of the plurality of resonance bands is in the short wavelength infrared (SWIR) portion of the electromagnetic spectrum.

9. The wavelength selective structure of claim 6, wherein the plurality of resonance bands have substantially equal efficiencies.

10. The wavelength selective structure of claim 6, wherein the plurality of resonance bands have substantially unequal efficiencies.

11. The wavelength selective structure of claim 1, wherein a location and/or a bandwidth of the at least one resonance band is based, at least in part, on at least one property selected from the group consisting of:
   a periodicity of the plurality of surface elements,
   a defect in an array of the plurality of surface elements,
   a size of the plurality of surface elements,
   a thickness of the at least one of the first metallic layer, the first dielectric layer, or the second metallic layer, and
   the properties of the materials used in the at least one of the first metallic layer, the first dielectric layer, or the second metallic layer.

12. The wavelength selective structure of claim 11, wherein the properties of the materials include conductivity, index of refraction, index of absorption and physical dimensions.

13. The wavelength selective structure of claim 1, wherein a first subset of the plurality of surface elements have a first size and/or a first shape and a second subset of the plurality of surface elements have a second size and/or a second shape.

14. The wavelength selective structure of claim 1, wherein the plurality of surface elements are arranged in an arrangement selected from one of a group consisting of an aperiodic array, a periodic array and a random array.

15. The wavelength selective structure of claim 14, wherein the arrangement is a periodic array selected from the group consisting of: a rectangular grid; a square grid; a triangular grid; an Archimedean grid; an oblique grid; a centered rectangular grid; and a hexagonal grid.

16. The wavelength selective structure of claim 1, wherein each surface element of the plurality of surface elements has a shape selected from the group consisting of: a circle; an ellipse; an annular ring; a rectangle; a square; a square ring; a triangle; a polygon; a hexagon; an octagon; a parallelogram; a cross; a Jerusalem cross; a double circle; an open annular ring; and an open square ring.

17. The wavelength selective structure of claim 1, wherein the plurality of surface elements do not contact one another.

18. The wavelength selective structure of claim 1, wherein the plurality of surface elements are connected via a connecting surface feature.

19. The wavelength selective structure of claim 1, wherein the surface elements have a size of less than about 50 micrometers.

20. The wavelength selective structure of claim 1, wherein the surface elements have a size of less than about 0.5 micrometers.

21. The wavelength selective structure of claim 1, wherein the surface elements are raised patches.

22. The wavelength selective structure of claim 1, wherein the surface elements are holes.

23. The wavelength selective structure of claim 1, wherein the over layer comprises at least one material from the group consisting of glass, ceramic, polymer, dielectric, metal material and semiconductor.

24. The wavelength selective structure of claim 1, wherein the over layer is configured to modify the incident electromagnetic radiation by performing at least one of focusing, de-focusing, or filtering the incident electromagnetic radiation.

25. The wavelength selective structure of claim 1, wherein a thickness of the over layer is less than a height of the compound layer.

26. The wavelength selective structure of claim 1, wherein the over layer covers the first metallic layer, the first dielectric layer, and the second metallic layer, and wherein a top surface of the over layer is a non-flat surface to conform to a shape of a top surface of the surface elements.

27. A method of reflecting and/or absorbing electromagnetic radiation, the method comprising:
   providing a wavelength selective structure comprising a plurality of layers, the plurality of layers comprising:
      a compound layer comprising a plurality of surface elements, wherein the compound layer comprises:
         a first metallic layer;
         a dielectric layer disposed on the first metallic layer; and
         a second metallic layer disposed on the dielectric layer;
      an electrically isolating intermediate layer, wherein the first metallic layer of the compound layer is in contact with a first surface of the electrically isolating intermediate layer;
      a continuous electrically conductive layer in contact with a second surface of the electrically isolating intermediate layer; and
      an over layer that at least partially fills gaps between the plurality of surface elements by covering the first metallic layer and the dielectric layer, wherein the reflecting and/or absorbing of the incident electromagnetic radiation is based at least in part on the over layer,
   wherein the selective surface has at least one resonance band for reflecting and/or absorbing incident visible or infrared radiation;
   receiving the incident electromagnetic radiation at the wavelength selective structure;
   absorbing a first portion of the electromagnetic radiation in the at least one resonance band; and reflecting a second portion of the electromagnetic radiation outside of the at least one resonance band.

* * * * *